United States Patent
Yamashita

(10) Patent No.: US 9,661,439 B2
(45) Date of Patent: May 23, 2017

(54) FUNCTION CONTROL APPARATUS AND PROGRAM

(71) Applicant: SONY CORPORATION, Tokyo (JP)

(72) Inventor: Kosei Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 14/648,667

(22) PCT Filed: Aug. 28, 2013

(86) PCT No.: PCT/JP2013/005088
§ 371 (c)(1),
(2) Date: May 29, 2015

(87) PCT Pub. No.: WO2014/087558
PCT Pub. Date: Jun. 12, 2014

(65) Prior Publication Data
US 2015/0304790 A1  Oct. 22, 2015

(30) Foreign Application Priority Data

Dec. 7, 2012  (JP) ................. 2012-268048

(51) Int. Cl.
| | | |
|---|---|---|
| H04R 5/02 | (2006.01) |
| G06F 3/13 | (2006.01) |
| H04S 7/00 | (2006.01) |
| G06F 3/16 | (2006.01) |
| G06F 3/01 | (2006.01) |
| G06F 21/31 | (2013.01) |
| G06F 21/32 | (2013.01) |

(52) U.S. Cl.
CPC .............. *H04S 7/302* (2013.01); *G06F 3/013* (2013.01); *G06F 3/167* (2013.01); *G06F 21/31* (2013.01); *G06F 21/32* (2013.01); *H04S 2420/01* (2013.01)

(58) Field of Classification Search
CPC .......... G06F 21/31; G06F 21/32; G06F 3/167; G06F 3/013; H04S 7/302; H04S 2420/01
See application file for complete search history.

(56) References Cited

U.S. PATENT DOCUMENTS

| | | | |
|---|---|---|---|
| 2007/0025555 A1* | 2/2007 | Gonai ...................... H04R 5/04 381/17 |
| 2011/0153044 A1 | 6/2011 | Lindahl et al. |
| 2012/0200601 A1 | 8/2012 | Osterhout et al. |
| 2014/0126758 A1* | 5/2014 | Van Der Wijst ........ H04S 7/304 381/310 |

FOREIGN PATENT DOCUMENTS

| | | |
|---|---|---|
| JP | 2008-113118 A | 5/2008 |
| JP | 2011-048665 A | 3/2011 |
| WO | 2004-099851 A2 | 11/2004 |

\* cited by examiner

*Primary Examiner* — Muhammad N Edun
(74) *Attorney, Agent, or Firm* — Chip Law Group

(57) ABSTRACT

An electronic device includes processing circuitry configured to produce an audio sound from a virtual sound source position. The circuitry also acquires from a user-input a sound position information of a perceived sound source position, and then controls an enable or disable of a function of the electronic device based on a relationship between the virtual sound source position and the perceived sound source position.

21 Claims, 24 Drawing Sheets

FUNCTION CONTROL APPARATUS AND PROGRAM

TECHNICAL FIELD

The present disclosure relates to a function control apparatus and a program.

The present disclosure contains subject matter related to that disclosed in Japanese Priority Patent Application JP 2012-268048 filed in the Japan Patent Office on Dec. 7, 2012, the entire content of which is hereby incorporated by reference.

BACKGROUND ART

In recent years, electronic devices such as PCs (Personal Computers) and portable phones (smartphones) have become deeply involved in people's lives. Such electronic devices provide various functions to users. Such functions include functions not necessarily desired to be accessed by an unspecified number of users. In order to protect such functions, locking an electronic device itself or some functions thereof is generally performed. For example, technology for simply performing such locking is described in Patent Literature 1.

A general manipulation for locking/unlocking is an input of a password, as also described in Patent Literature 1 described above. However, the password may be leaked by being observed surreptitiously as pointed out in Patent Literature 1 and a security level may not be said to be high. Therefore, in Patent Literature 1, a technology for using a combination of a pressing position on a touch panel and a pressing force in each position as an input has been proposed.

CITATION LIST

Patent Literature

[PTL 1]
Japanese Patent Laid-Open Publication No. 2011-48665

SUMMARY

Technical Problem

However, even in the technology described in Patent Literature 1, since an appearance of input may be viewed from the outside, an input manipulation may be imitated and accordingly a security level may not be said to be sufficiently high. Further, even when the password is used or even when the pressing position and the pressing force are used, it is necessary for a user to memorize a previously set input pattern in order to perform unlocking. When the user forgets the input pattern, a function may not be used and there is still room for improvement in terms of usability.

Therefore, in the present disclosure, a function control apparatus and a program, which are new and improved, and in which usability is improved while securing a security level of a locking for functions of an electronic device, are proposed.

Solution to Problem

An electronic device includes processing circuitry configured to produce an audio sound from a virtual sound source position. The circuitry also acquires from a user-input a sound position information of a perceived sound source position, and then controls an enable or disable of a function of the electronic device based on a relationship between the virtual sound source position and the perceived sound source position.

An information processing method includes producing with a speaker an audio sound from a virtual sound source position and acquiring from a user-input interface a sound position information of a perceived sound source position. Processing circuitry controls an enable or disable of a function of the electronic device based on a relationship between the virtual sound source position and the perceived sound source position.

A non-transitory computer readable storage medium having stored therein computer readable instructions that when executed by processing circuitry cause the processing circuitry to execute an information processing method, the method including producing with a speaker an audio sound from a virtual sound source position and acquiring from a user-input interface a sound position information of a perceived sound source position. Processing circuitry controls an enable or disable of a function of the electronic device based on a relationship between the virtual sound source position and the perceived sound source position.

Advantageous Effects of Invention

As described above, according to embodiments of the present disclosure, it is possible to improve usability while securing a security level of locking for functions of an electronic device.

DESCRIPTION OF EMBODIMENTS

Figure 1:
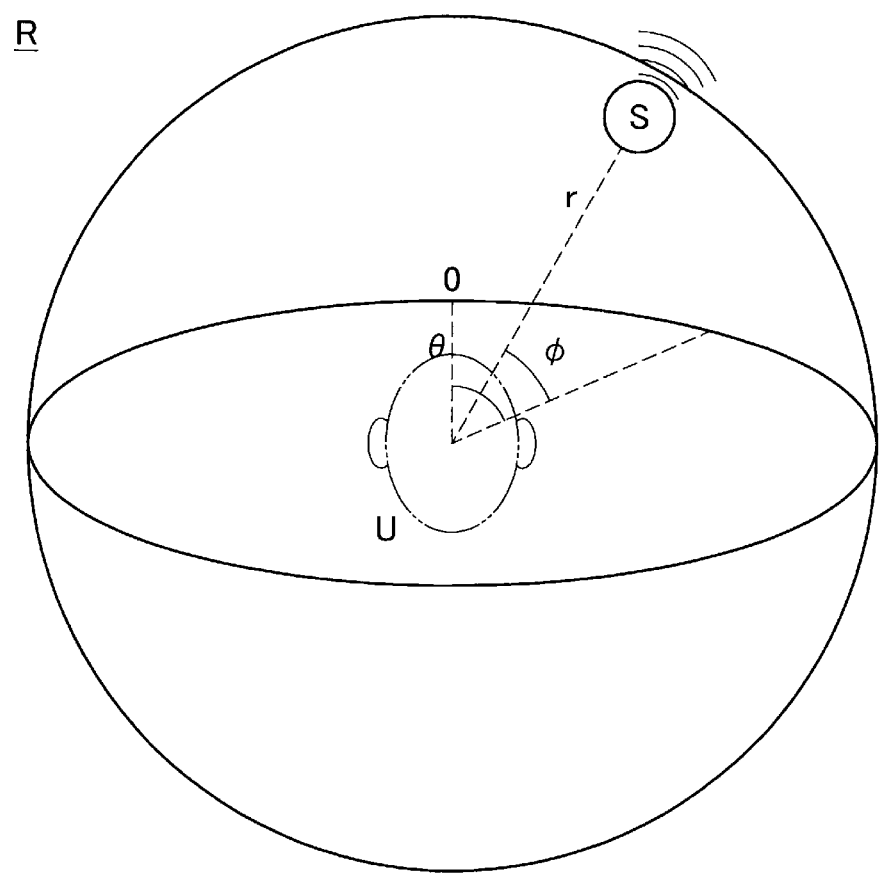
FIG. 1 is a diagram illustrating a sound source in a three-dimensional acoustic space.

Hereinafter, preferred embodiments of the present disclosure will be described in detail with reference to accompanying drawings. Further, in the present specification and drawings, components having substantially the same functional configuration are denoted by the same reference numerals and a repeated description is omitted.

Further, a description will be given in the following order.
1. Basic Idea of User Recognition Using Head-Related Transfer Function
2. Embodiments of the Present Disclosure
2-1. First Embodiment
2-2. Second Embodiment
2-3. Third Embodiment
2-4. Fourth Embodiment
3. Hardware Configuration
4. Supplemental Remarks (1. Basic Idea of User Recognition Using Head-related Transfer Function)

In embodiments of the present disclosure which will be described below, a user is recognized using a head-related transfer function. First, a basic idea of the user recognition using this head-related transfer function will be described with reference to FIGS. 1 to 6.

(Head-Related Transfer Function)

FIG. 1 is a diagram illustrating a sound source in a three-dimensional acoustic space.

A three-dimensional acoustic space R is a space around a user U who is a listener, and has a sound source S present therein. In the following description, a position of the sound source S is expressed using a moving radius r and deflection angles theta and phi in a polar coordinate system in which a position of the user U is an origin. The position of the user U may be exactly at a middle point of a line connecting right and left ears of the user U. The moving radius r is a distance from this point to the position of the sound source S. Further, the deflection angle theta is an angle formed between a direction of a front of the user U and a direction of the sound source S within a horizontal plane. The deflection angle phi is an angle formed between a horizontal plane including the position of the user U and the direction of the sound source S within a vertical plane.

Figure 2:
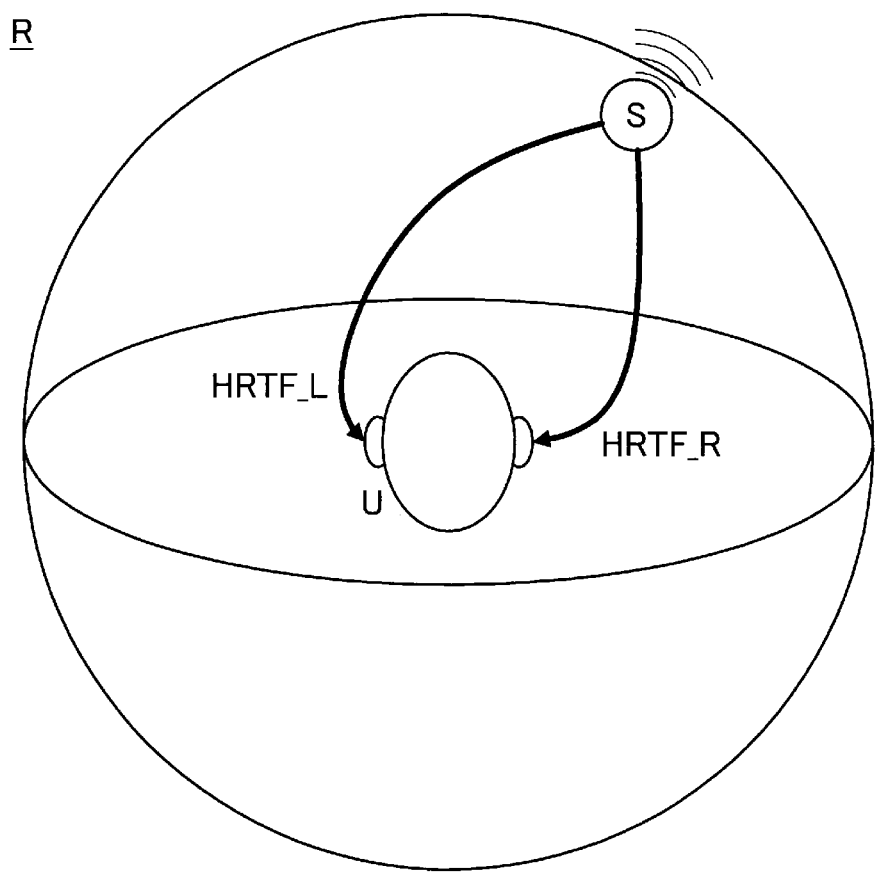
FIG. 2 is a diagram illustrating a head-related transfer function in the three-dimensional acoustic space.

FIG. 2 is a diagram illustrating a head-related transfer function in a three-dimensional acoustic space.

Here, in a sound wave arriving at an eardrum of a user U (hereinafter referred to as a heard sound), a specific frequency component of the sound wave radiated from a sound source S (hereinafter referred to as an original sound) is emphasized or attenuated due to reflection and diffraction at the head or the ear of the user U. Since a process in which the original sound is reflected or diffracted may also differ between a left ear and a right ear of the user U, frequency components of the heard sound differ. Further, since a distance from the sound source S differs between the left ear and the right ear of the user U, phases of the heard sound may also differ.

In this case, a transfer function expressing a change from the original sound to the heard sound is a head-related transfer function (HRTF). The HRTF greatly depends on, particularly, a shape of a head, a shape of an auricle, a shape of an external auditory canal, sound impedance of skin and the like of the user. In other words, the HRTF is a function varying depending on each user. Further, the HRTF varies depending on a position of the sound source S in the three-dimensional acoustic space R.

In FIG. 2, the sound wave from the sound source S changes in a head-related transfer function HRTF_L and arrives at the eardrum of the left ear of the user U, and changes in a head-related transfer function HRTF_R and arrives at the eardrum of the right ear of the user U. As described above, the HRTF is specific to each user and varies depending on the position of the sound source S. Therefore, the HRTF_L and the HRTF_R are functions that depend on the user U and the moving radius r and the deflection angles theta and phi indicating the position of the sound source S and are expressed as HRTF_L(U, r, theta, phi) and HRTF_R(U, r, theta, phi).

A brain that is a sense center of the user U recognizes a relationship between the position (r, theta, phi) of the sound source S and the head-related transfer function HRTF through experience. Accordingly, the user U can recognize the position (r, theta, phi) of the sound source S based on the heard sound changed in HRTF_L(U, r, theta, phi) and HRTF_R(U, r, theta, phi).

The HRTF is a transfer property between the original sound and the heard sound expressed in a frequency domain. When this HRTF is subjected to an inverse discrete Fourier transform, a head-related impulse response (HRIR) may be obtained. The HRIR is the transfer property between the original sound and the heard sound expressed in a time domain, and is included in the head-related transfer function in a broad sense. The HRIR also differs between the left ear and the right ear, is a function that depends on the user U and the moving radius r and the deflection angles theta and phi indicating the position of the sound source S, and is expressed as HRIR_L(U, r, theta, phi) and HRIR_R(U, r, theta, phi), similar to the HRTF.

Figure 3:
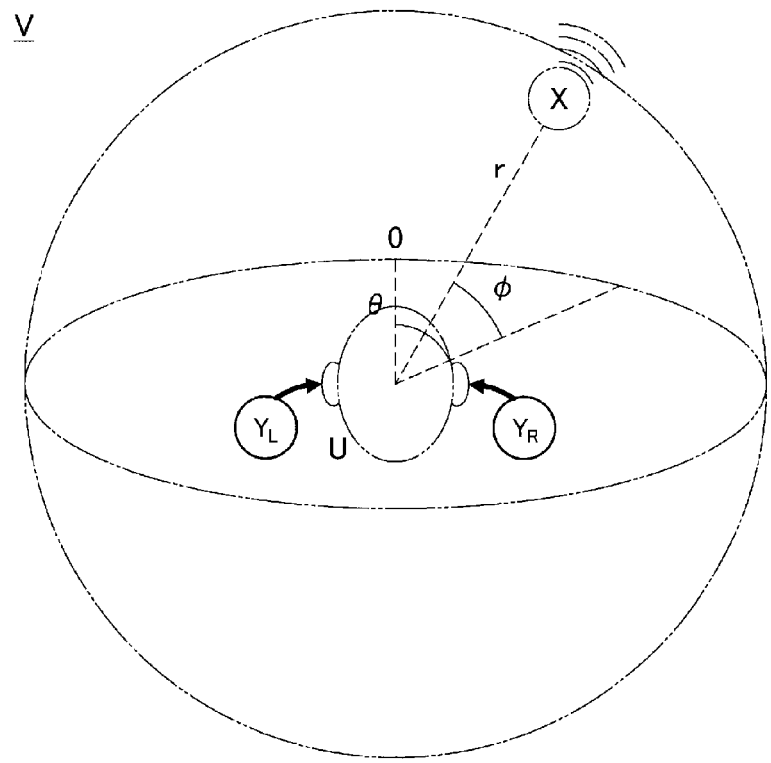
FIG. 3 is a diagram illustrating reproduction of a virtual sound source.

FIG. 3 is a diagram illustrating reproduction of a virtual sound source.

A three-dimensional acoustic space V is a virtual space recognized as a space around a user U who is a listener. When measured head-related impulse responses HRIR_L (U, r, theta, phi) and HRIR_R(U, r, theta, phi) are subjected to convolution with original sound X, the original sound X changes similarly to a heard sound radiated from a sound source S present in a position (r, theta, phi) in a real three-dimensional acoustic space R and arriving at an eardrum of the user U. Therefore, when a sound wave after the convolution is radiated from the vicinity of the eardrum of the user U, the user perceives a sound source located in the position (r, theta, phi) in the virtual three-dimensional acoustic space V. This may be called a kind of acoustic illusion. In this case, an output signal $Y_L$ to a left ear of the user and an output signal $Y_R$ to a right ear are represented by the following mathematical equations 1 and 2, respectively. Further, "*" indicates a convolution operation.

$$Y_L = X * \text{HRIR\_}L(U, r, \theta, \phi) \quad \text{(Equation 1)}$$

$$Y_R = X * \text{HRIR\_}R(U, r, \theta, \phi) \quad \text{(Equation 2)}.$$

The HRIR of the user U is obtained by reproducing an impulse signal, a TSP (Time Stretched Pulse) signal or the like as a sound source S in the real sound space R, measuring HRTF_L and HRTF_R in a frequency domain by receiving a heard sound using microphones mounted on a left ear and a right ear of the user U, and performing an inverse discrete Fourier transform on HRTF_L and HRTF_R. Further, the HRIR may be obtained directly in a time domain from the measured impulse reply signal.

Since the HRIR depends on the moving radius r and the deflection angles theta and phi indicating the position of the sound source S as described above, it is desirable for the HRIR to be measured in each position in which the sound source S is likely to be located. For example, measuring the HRIR in all combinations of the deflection angles theta and phi while fixing the moving radius r up to the sound source S to a predetermined distance such as 1 m and changing the deflection angle theta or the deflection angle phi by 1 degree may be considered. Although minimum resolution of an azimuth angle recognized by hearing depends on a direction as well, since it is about 1 degree, the virtual sound source present in an arbitrary position in which the distance from the user U in the three-dimensional acoustic space V is r can be reproduced by measuring the HRIR at an observation point on a mesh in which the deflection angles theta and phi are changed by 1 degree.

Further, for example, a headphone (including an inner ear type headphone) or the like is used for the radiation of the sound wave from the vicinity of the eardrum of the user U. In this case, the position of the sound source can be caused to he perceived by the user U more exactly by applying correction of a transfer property of an external auditory canal, correction of an acoustic feature of a speaker driver of the headphone, and the like considering a mounting position of the headphone. Further, a transaural system, which will be described below, may be used for the radiation of the sound wave to the vicinity of the eardrum of the user U.

Figure 4:
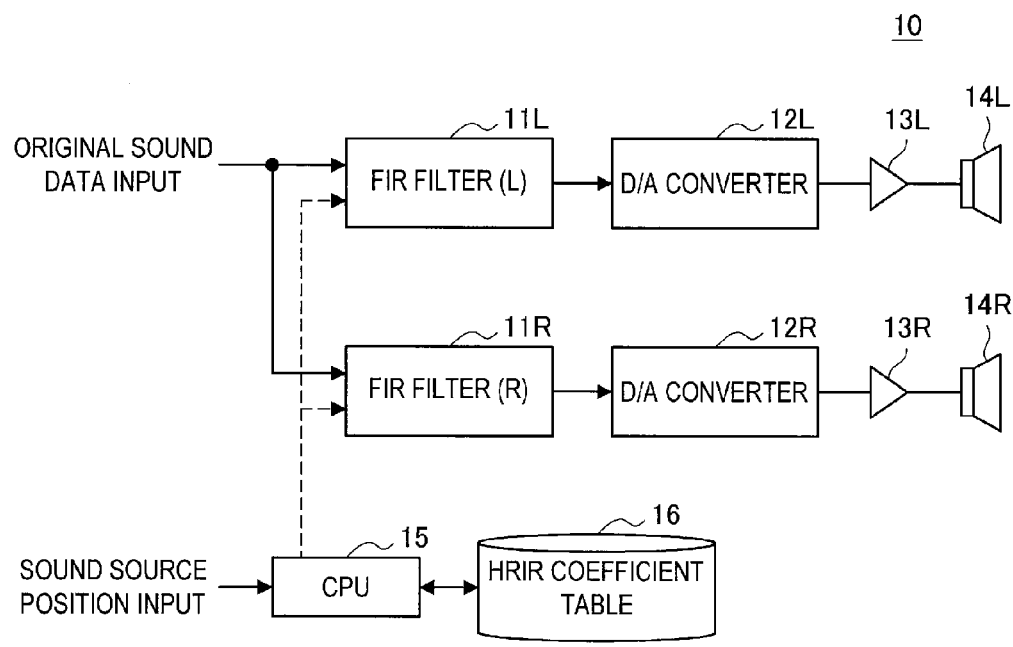
FIG. 4 is a diagram illustrating an example of an apparatus configuration for reproducing a virtual sound source.

FIG. 4 is a diagram illustrating an example of an apparatus configuration for reproducing a virtual sound source.

In an apparatus 10, convolution of input original sound data (monaural) and HRIR_L or HRIR_R is executed by left and right FIR (Finite Impulse Response) filters 11L and 11R. The original sound data is input, for example, as a digital signal with a sampling frequency of 44.1 KHz and a quantization bit number of 16 bits. Here, when a tap length of an HRIR coefficient is assumed to be 512 samples, the convolution in the FIR filters 11L and 11R is a product-sum operation process of 512 taps. The FIR filters may be mounted as operational hardware such as a DSP (Digital Signal Processor) or may be mounted as software signal processing of a CPU (Central Processing Unit).

As a result of the convolution in the FIR filters 11L and 11R, an output signal $Y_L$ to the left ear and an output signal $Y_R$ to the right ear of the user may be obtained. These signals are converted from a digital signal to an analog signal by D/A converters 12L and 12R, amplified by amplifiers 13L and 13R, and output from speakers 14L and 14R to a user U who is a listener. The speakers 14L and 14R are headphones or speakers having a function of outputting separate sounds to the left ear and the right ear of the user U, such as speakers constituting a transaural system, as will be described below.

Here, the FIR filters 11L and 11R are controlled by a CPU 15. The CPU 15 acquires an HRIR coefficient from an HRIR coefficient table 16 stored in a storage device or the like, according to an input sound source position. The HRIR coefficient is, for example, tied to a user ID that identifies the user U and stored for each of HRIR_L and HRIR_R for each combination of the moving radius r and the deflection angles theta and phi indicating the position of the sound source S.

(User Recognition Using Head-Related Transfer Function)

The HRTF and HRIR, which are head-related transfer functions, are functions specific to respective users, as described above. The user U empirically learns how an original sound radiated from the sound source S present in the position (r, theta, phi) by his or her HRTF becomes the heard sound. The user U is able to recognize the position of the sound source S from the heard sound through such learning.

Therefore, the user does not perceive the sound source located in the position (r, theta, phi) in the virtual three-dimensional acoustic space V, for example, even when sound obtained by performing convolution of head-related impulse responses HRIR_L(U', r, theta, phi) and HRIR_R (U', r, theta, phi) of the other user U' with the original sound X is radiated from the vicinity of an eardrum of the user U in the reproduction of the sound source in the virtual three-dimensional acoustic space V shown in FIG. 3. This is because a change of the original sound X by the HRTF of the other user U' differs from a change by the HRTF of the user U that the user U is empirically learning. Thus, it is a generally well-known phenomenon that an individual difference in perception of the localization of the virtual sound source is remarkable.

When the original sound X with which the HRIR calculated from the HRTF that is not the HRTF of the user is subjected to convolution is presented to the user U, the position of the sound source is not correctly perceived as described above. Particularly, it is very difficult to perform exact localization in any front or vertical position (front localization and vertical localization). In this case, the sound source is known to be localized inside the head of the user U (in-head localization) or in an incorrect position behind the user U (backward localization) and perceived.

On the other hand, when the original sound X with which the head-related impulse responses HRIR_L(U, r, theta, phi) and HRIR_R(U, r, theta, phi) of the user U are subjected to convolution is presented, only the user U can correctly perceive that the sound source is present in the position (r, theta, phi).

A basic idea of the user recognition using the head-related transfer function is based on discovery described above. In other words, the user recognition using the head-related transfer function is to recognize the user U by using the head-related transfer function such as the HRIR of the user U as a template and estimating a position of a sound source virtually generated using the head-related transfer function. In this recognition, the user U is recognized as himself or herself, for example, only when the position of the virtually generated sound source is exactly estimated within a predetermined minute error range.

Further, the user recognition using the head-related transfer function may be used not only to recognize the user himself or herself as described above, but also to recognize an attribute of the user. Since the HRTF is a function determined, for example, depending on a shape of a head, a shape of an auricle, a shape of an external auditory canal, sound impedance of skin and the like of the user as described above, the HRTF may also be considered to be similar to some extent between users having such similar attributes. Accordingly, a level of the recognition may be adjusted from strict recognition limited to the user himself or herself to relatively lax recognition capable of recognizing a user group having a predetermined attribute by regulating an error range allowed in the recognition. Therefore, "recognition of the user U" in the following description may be replaced with "recognition of whether or not a user is a user having a predetermined attribute."

Figure 5:
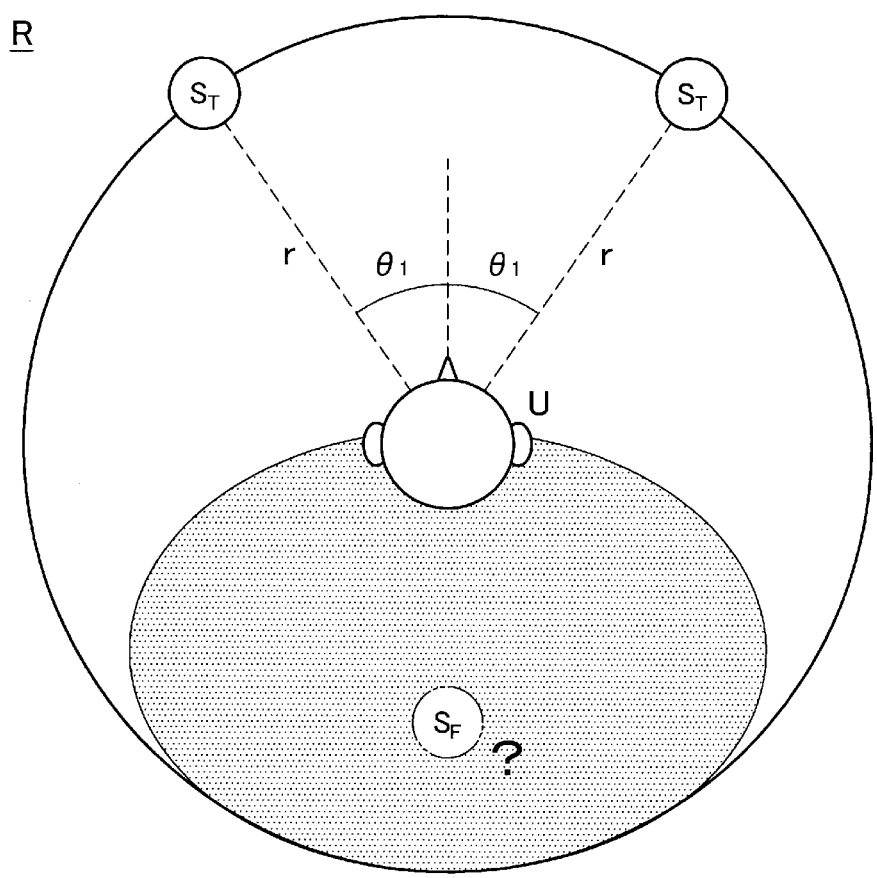
FIG. 5 is a diagram conceptually illustrating an example of user recognition using the head-related transfer function.

FIG. 5 is a diagram conceptually illustrating an example of user recognition using a head-related transfer function.

For example, a sound source $S_T$ present in a position (r, $theta_1$, 0) in front of a user U is virtually reproduced by performing convolution of head-related impulse responses HRIR_L(U, r, $theta_1$, 0) and HRIR_R(U, r, $theta_1$, 0) with original sound X and presented to a listener. In this case, if the listener is the user U, the listener may correctly perceive the position of the sound source $S_T$. On the other hand, if the listener is not the user U, the listener is not able to correctly perceive the position of the sound source $S_T$ and erroneously perceives the position, for example, to be a sound source $S_F$ located behind the listener. Therefore, if the position of the sound source $S_T$ present in front of the user U is estimated, the user U can be recognized with high precision.

Figure 6:
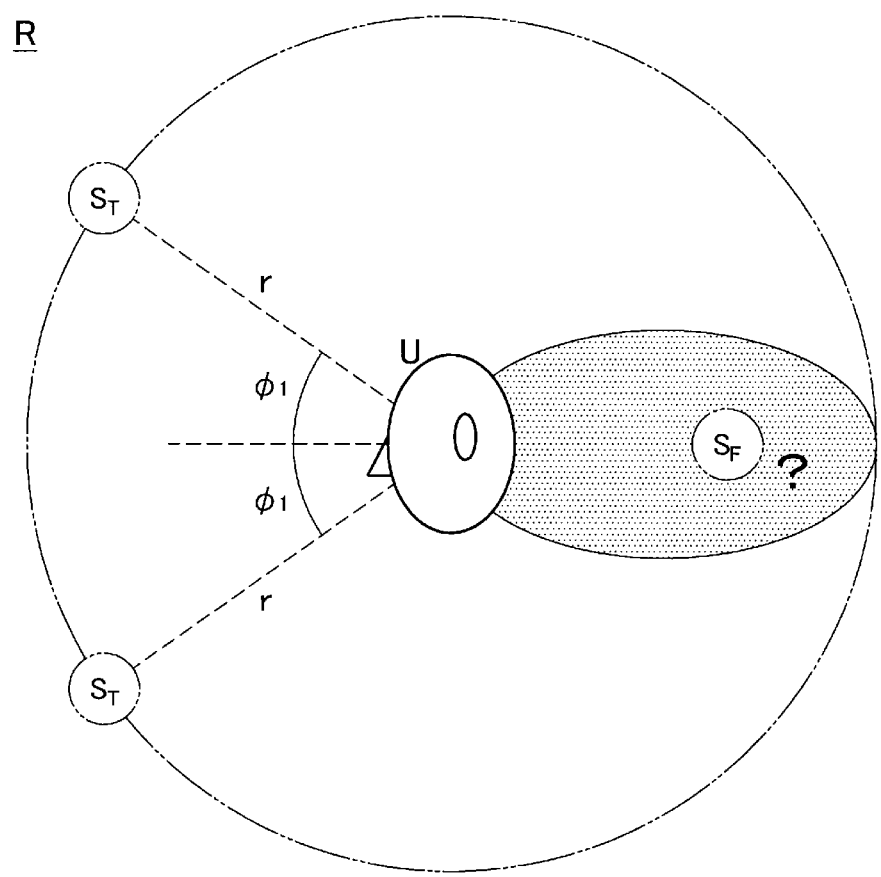
FIG. 6 is a diagram conceptually illustrating another example of the user recognition using the head-related transfer function.

FIG. 6 is a diagram conceptually illustrating another example of user recognition using a head-related transfer function.

When the original sound X with which the HRIR calculated from the HRTF that is not the HRTF of the user U is subjected to convolution is presented to the user U as described above, the sound source is localized in an incorrect position inside the head of the user U or behind the user U and perceived. A range in which this incorrect position is distributed is particularly narrow in a vertical direction of the user U. In other words, when the original sound X with which the HRIR calculated from the HRTF that is not the HRTF of the user U is subjected to convolution is presented, it is very difficult for a listener to identify a height of the sound source.

For example, a sound source $S_T$ present in a position (r, 0, $phi_1$) in front of the user U is virtually reproduced by performing convolution of head-related impulse responses HRIR_L(U, r, 0, $phi_1$) and HRIR_R(U, r, 0, $phi_1$) with original sound X and presented to the listener. In this case, if the listener is the user U, the listener is able to correctly perceive the position of the sound source $S_T$. On the other hand, if the listener is not the user U, the listener is not able to correctly perceive the position of the sound source $S_T$ and erroneously perceives the position to be a sound source $S_F$ located at the same height as the listener behind the listener in many cases. Therefore, if the position of the sound source $S_T$ present in any one of a plurality of positions at different heights when viewed from the user U is estimated, the user U can be recognized with high precision.

(2. Embodiments of Present Disclosure)

Next, some embodiments in which a lock state of an electronic device is controlled using the basic idea described above will be described.

(2-1. First Embodiment)

First, a first embodiment of the present disclosure will be described with reference to FIGS. 7 to 16. In the present embodiment, a virtual sound source reproduced using the head-related transfer function is output from a headphone of a head mount display (HMD). A user hearing the output sound source replies with an estimated position of the sound source, for example, using an input button or the like of the HMD. When the reply is correct, a function of the HMD, a converter or a playback device providing content to the HMD is unlocked.

Here, the head-related transfer function used for reproduction of the virtual sound source may be, for example, a head-related transfer function of a specific user measured in advance. Further, the head-related transfer function may be, for example, an average head-related transfer function of a user group having a predetermined attribute. As described above, the head-related transfer function is specific to each user, but when there is a difference in sizes of a heads of users and a state of skin according to an attribute like an adult and a child, it is considered that there may be a difference in the average head-related transfer function for each attribute. Accordingly, it can be determined whether the user has the attribute, for example, whether the user is an adult or not, through the reproduction of the sound source using the average head-related transfer function.

(System Configuration)

Figure 7:
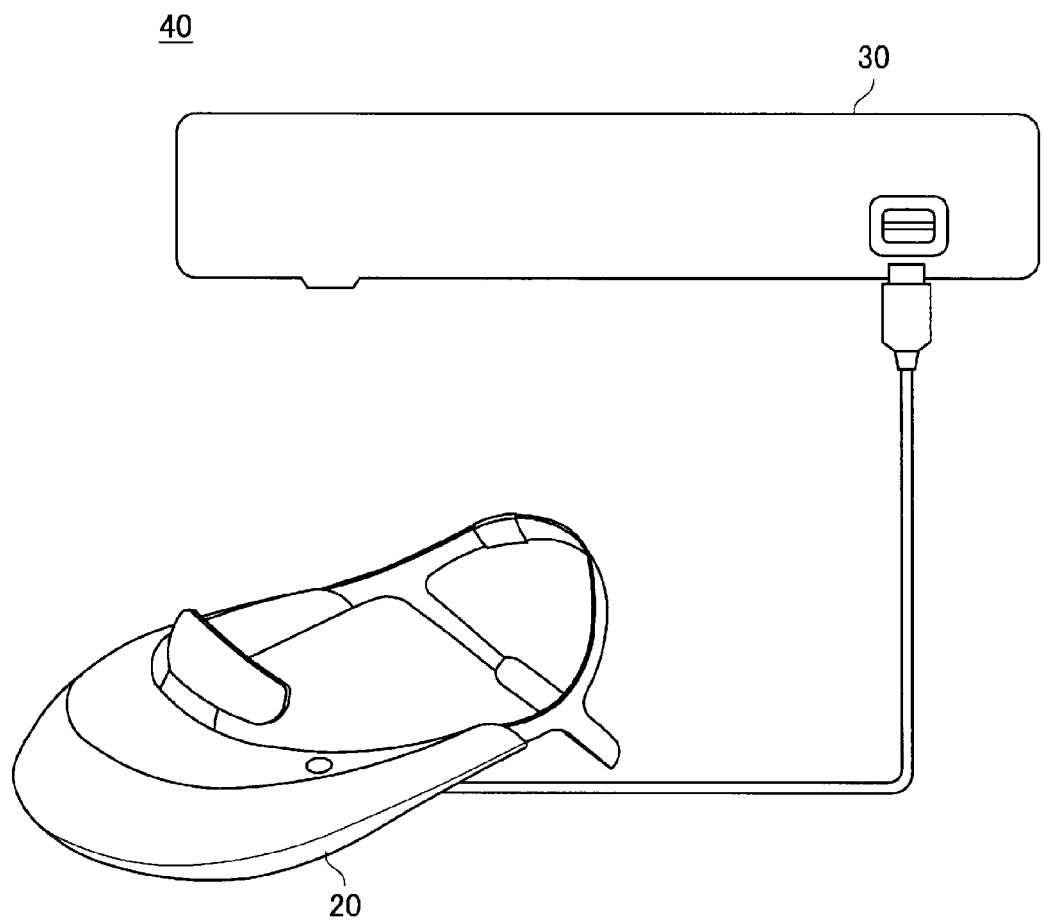
FIG. 7 is a diagram illustrating a schematic configuration of a system according to a first embodiment of the present disclosure.

FIG. 7 is a diagram illustrating a schematic configuration of a system according to a first embodiment of the present disclosure. Referring to FIG. 7, the system 40 includes an HMD 20 and a converter 30. The HMD 20 is a device mounted on a head of a user for displaying an image for each of left and right eyes of the user and outputting sound to each of left and right ears of the user. The converter 30, for example, converts data of an image and sound (e.g., constructed for reproduction in a normal display) output from a playback device, such as a recorder, a game console, or a television tuner, to data of an image and sound that can be output on the HMD 20, and provides the converted data to the HMD 20.

In an illustrated example, the HMD 20 and the converter 30 are connected by a cable. However, in other embodiments of the present disclosure, the HMD 20 and converter 30 may be wirelessly connected or the HMD 20 and converter 30 may be integrally formed. Alternatively, when the HMD 20 reproduces an image and sound constructed for reproduction in the HMD in advance, the converter 30 is unnecessary, and the data of the image and the sound output from the playback device such as a recorder, a game console or a television tuner may be directly input to the HMD 20.

Further, since well-known technology as described, for example, in Japanese Patent Laid-Open Publication No. 2008-83290 may be used as the configuration for reproduction of the image and the sound using the HMD 20, a detailed description is omitted herein.

Figure 8:
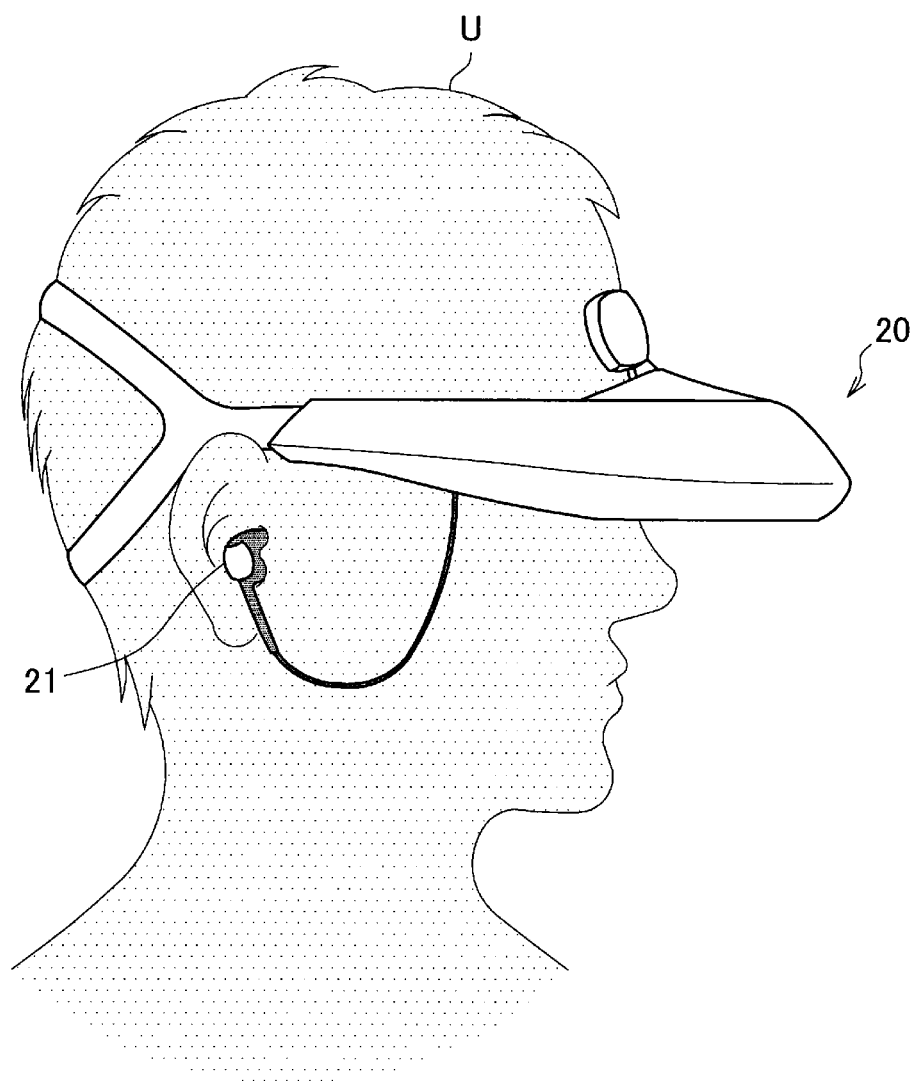
FIG. 8 is a diagram illustrating a mounting state of an HMD according to the first embodiment of the present disclosure.

FIG. 8 is a diagram illustrating a mounting state of the HMD according to the first embodiment of the present disclosure. Referring to FIG. 8, the HMD 20 is mounted on the head of the user U to cover right and left eyes of the user. Further, an inner ear type headphone 21 connected to the HMD 20 is mounted in right and left ears of the user U.

Further, in an illustrated example, the HMD 20 is a non-see through type, but the HMD may be a see-through type in other embodiments of the present disclosure. In that case, the HMD may have a glasses shape as described, for example, in Japanese Patent Laid-Open Publication No. 2008-83290. Further, the headphone 21 may not necessarily be connected to the HMD 20 and may be connected, for example, to the converter 30 separately from the HMD.

Figure 9:
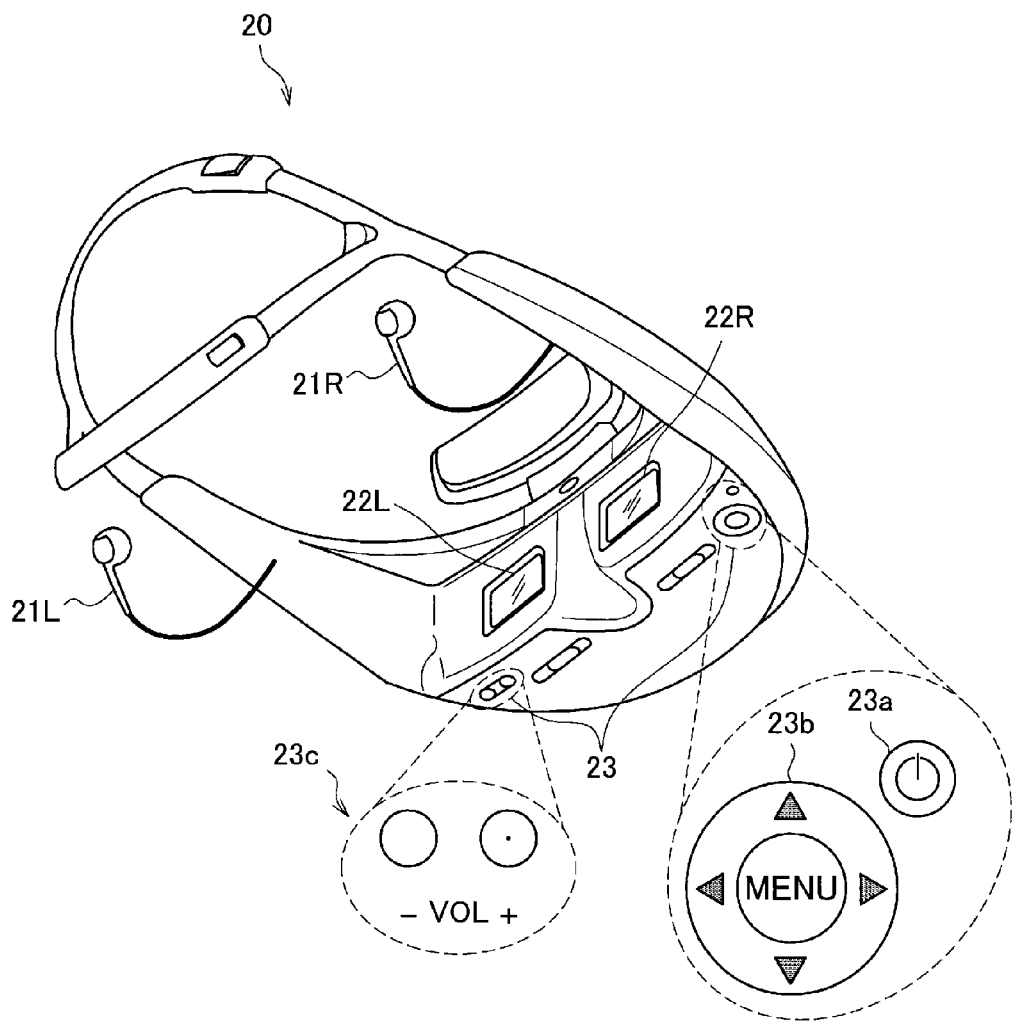
FIG. 9 is a perspective view of the HMD when viewed from below according to the first embodiment of the present disclosure.

FIG. 9 is a perspective view when the HMD according to the first embodiment of the present disclosure is viewed from below. Referring to FIG. 9, the HMD 20 includes a display unit 22 and a manipulation unit 23, in addition to a headphone 21. The headphone 21 includes a headphone 21L mounted on a left ear of the user U and a headphone 21R mounted on a right ear of the user U. Further, the display unit 22 includes a display unit 22L that displays an image toward a left eye of the user, and a display unit 22R that displays an image toward a right eye of the user. Sound is independently output to the right ear and the left ear of the user, and the image is independently displayed to the right eye and the left eye of the user by the headphone 21 and the display unit 22. For example, an LCD (Liquid Crystal Display) or an organic EL (Electroluminescence) display may be used for the display unit 22.

The manipulation unit 23 includes buttons provided on a lower surface of the HMD 20. In the illustrated example, the manipulation unit 23 includes a power button 23a, a direction/menu button 23b and a volume button 23c. Further, in other embodiments of the present disclosure, the manipulation unit 23 may include types of buttons different from those in the illustrated example, or switches or levers rather than the buttons. Since the view of the user is occupied by an image (including an image of an external world viewed through transmission when the HMD is a see-through type) displayed on the display unit 22 while the user is wearing the HMD 20, the user manipulates the manipulation unit 23 blind, i.e., without viewing the manipulation unit 23.

The HMD 20 as described above exhibits excellent performance compared to a normal display, for example, in terms of beauty of an image, a sense of reality felt by the user, or immersion. On the other hand, since a distance between the display unit and the eyes of the user is short, health of growing children may be affected. Therefore, for example, it is recommended that a so-called child lock be set to prevent a child from using the HMD 20.

The child lock is a mechanism in which input of a password is requested, for example, when it is determined that the HMD 20 has been mounted in order to prevent a child from using the HMD 20, and a lock set for a function of the HMD 20 is released to allow the HMD 20 to be used only when a correct password is input. However, since the user manipulates the manipulation unit 23 of the HMD 20 blind as described above, although there is no problem with simple manipulations such as reproduction control or volume adjustment for content, complex manipulations such as the input of the password are not easy.

Further, as described above, it may not be said that a security level of a setting of the lock by the input of the password is high. For example, a password set by a parent may be easily guessed by a child with whom they live. When a complex password that is hard for the child to guess is set, inputting the password using the manipulation unit 23 as described above is troublesome and the parent is likely to forget the password and not be able to use the HMD 20.

Therefore, in the present embodiment, a function control apparatus as will be described below is provided to improve usability while securing a security level of locking for the function.

(Configuration of Function Control Apparatus)

Figure 10:
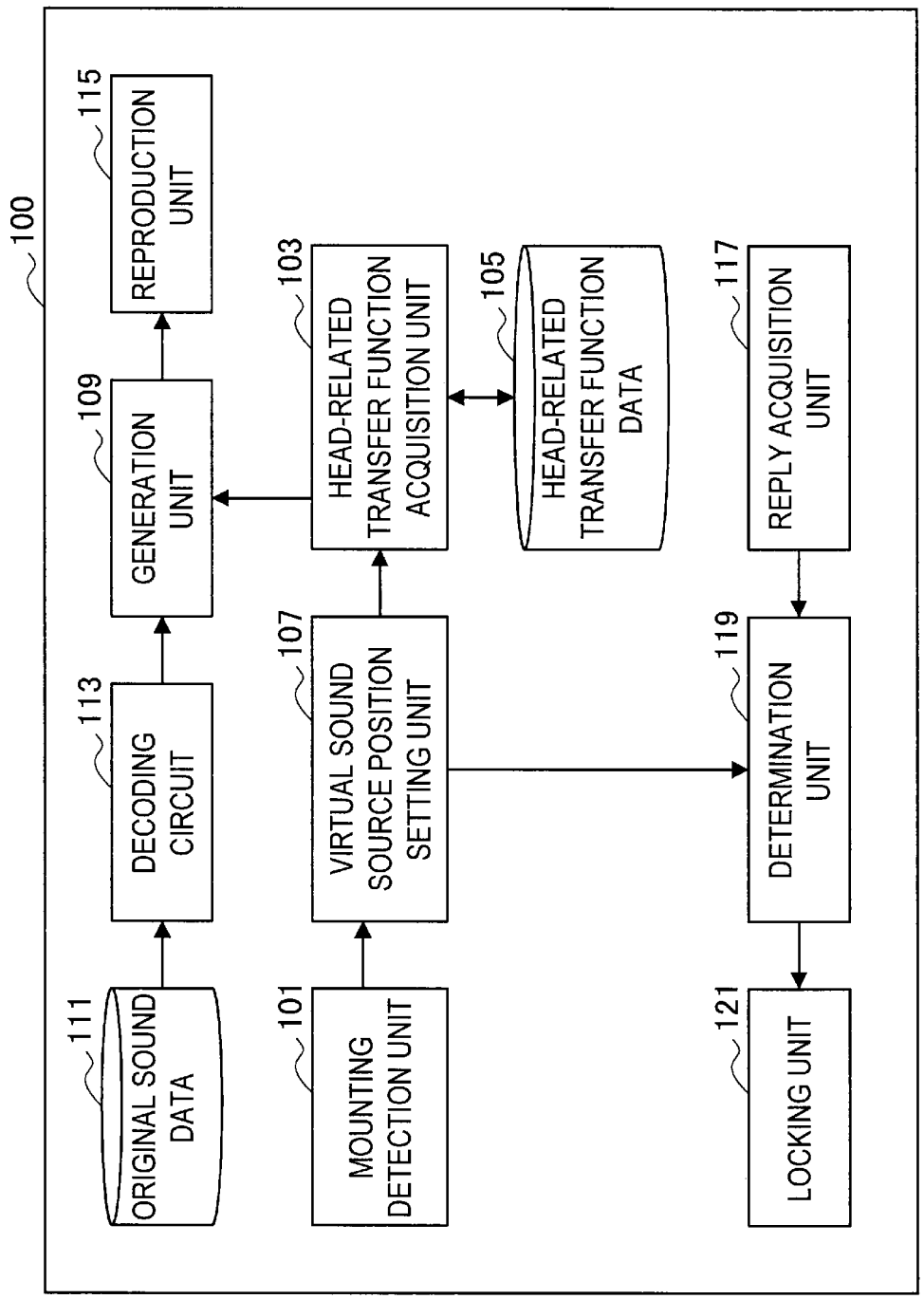
FIG. 10 is a block diagram illustrating a schematic functional configuration of a function control apparatus according to the first embodiment of the present disclosure.

FIG. 10 is a block diagram illustrating a schematic functional configuration of a function control apparatus according to the first embodiment of the present disclosure. Referring to FIG. 10, the function control apparatus 100 includes a mounting detection unit 101, a head-related transfer function acquisition unit 103, a virtual sound source position setting unit 107, a generation unit 109, a decoding circuit 113, a reproduction unit 115, a reply acquisition unit 117, a determination unit 119 and a locking unit 121. Further, the function control apparatus 100 refers to head-related transfer function data 105 and original sound data 111 stored in a storage device or the like.

The function control apparatus 100 is included in the system 40 and controls the lock of the function of the HMD 20. For example, the function control apparatus 100 may be incorporated in the HMD 20. Further, the function control apparatus 100 may be incorporated in the converter 30. Alternatively, the function control apparatus 100 may be included in the system 40 as an independent apparatus. When the function control apparatus 100 is not incorporated in the HMD 20, detection of mounting by the mounting detection unit 101, reproduction of sound data by the reproduction unit 115, acquisition of a reply by the reply acquisition unit 117 and control of function locking by the locking unit 121 may be executed through wired or wireless communication with the HMD 20. The function control apparatus 100 may be realized, for example, by a hardware configuration of an information processing apparatus that will be described below.

The mounting detection unit 101 detects that the HMD 20 has been mounted by the user, for example, based on a detection value of a sensor (a contact sensor, a gyro sensor, an acceleration sensor or the like) provided in the HMD 20. Alternatively, the mounting detection unit 101 may detect that the HMD 20 has been mounted by the user when a mechanical switch provided in the HMD 20 is switched due to the user wearing the HMD 20 or due to an explicit manipulation of the user. When it is detected that the HMD 20 has been mounted by the user, the mounting detection unit 101 causes the virtual sound source position setting unit 107 to start a process of unlocking the function of the HMD 20. Further, the function of the mounting detection unit 101 may be replaced, for example, with detection of a state change of the HMD 20 from a standby state to a start-up state due to the user pushing the power button 23a of the manipulation unit 23.

The head-related transfer function acquisition unit 103 acquires a head-related transfer function prepared in advance with reference to the head-related transfer function data 105. Here, the acquired head-related transfer function may be a head-related transfer function measured for the user U of the HMD 20 in advance. Alternatively, the head-related transfer function may be a head-related transfer function provided as an average head-related transfer function of a user group having a common attribute. As described above, the head-related transfer function depends on the position (r, theta, phi) of the sound source S, in addition to the user U (or an attribute of the user U). Therefore, the head-related transfer function acquisition unit 103 acquires the information of the head-related transfer function measured and stored in advance with reference to the head-related transfer function data 105 using the position of the virtual sound source acquired from the virtual sound source position setting unit 107. Here, the acquired head-related transfer function is, for example, an HRIR. The head-related transfer function acquisition unit 103 provides information of the acquired head-related transfer function to the generation unit 109.

The virtual sound source position setting unit 107 randomly sets the position (r, theta, phi) of the virtual sound source. The virtual sound source position setting unit 107 sets any position of the virtual three-dimensional acoustic space V as the position of the virtual sound source (hereinafter referred to as a first position). In the present embodiment, since the reply with the position of the virtual sound source is performed by a selection from nine options as will be described below, the virtual sound source position setting unit 107 sets any one of nine positions in the three-dimensional acoustic space V corresponding to the nine options as the position of the virtual sound source. The virtual sound source position setting unit 107 provides information of the set position of the virtual sound source to the head-related transfer function acquisition unit 103 and the determination unit 119.

As described above, the head-related transfer function acquisition unit 103 acquires a head-related transfer function from the head-related transfer function data 105 based on the position set by the virtual sound source position setting unit 107. Here, the position set by the virtual sound source position setting unit 107 is any one of the nine positions. Therefore, head-related transfer functions of at least the nine positions described above are prepared in the head-related transfer function data 105 in advance.

The generation unit 109 generates sound data obtained by virtually reproducing the sound source present in the first position in the three-dimensional acoustic space V using the head-related transfer function. The generation unit 109 acquires the information of the head-related transfer function in the first position set by the virtual sound source position setting unit 107 from the head-related transfer function acquisition unit 103. The generation unit 109 may be realized using an FIR filter, similar to, for example, a case of the apparatus 10 shown in FIG. 4. The generation unit 109 processes the data of the original sound provided from the decoding circuit 113 using the head-related transfer function and generates the sound data of the virtual sound source. The generation unit 109 provides the generated sound data to the reproduction unit 115.

The decoding circuit 113 decodes the original sound data 111. The original sound data 111 is, for example, monaural sound data that has been MP3-compressed at a sampling frequency of 44.1 KHz and in a quantization bit number of 16 bits. The decoding circuit 113 decodes this sound data, demodulates the sound data into a PCM signal, and provides the PCM signal to the generation unit 109.

The reproduction unit 115 reproduces the sound data provided from the generation unit 109 toward the user. The reproduction unit 115 may be, for example, an interface connected to the headphone 21 and may include a D/A converter, an amplifier or the like. The reproduction unit 115 provides the sound data to the headphone 21 to be output toward the user. In this case, the headphones 21L and 21R shown in FIG. 9 function as the speakers 14L and 14R shown in FIG. 4.

The reply acquisition unit 117 acquires the position of the virtual sound source in the three-dimensional acoustic space V estimated by the user hearing the sound data reproduced by the reproduction unit 115 through the headphone 21 (hereinafter referred to as the second position) as a reply. The reply acquisition unit 117 is, for example, an interface connected to the manipulation unit 23, and acquires information indicating a position input by the user using the manipulation unit 23, specifically, the direction/menu button 23b. The reply acquisition unit 117 provides the acquired information of the second position to the determination unit 119.

The determination unit 119 determines whether the HMD 20 is to be unlocked to validate a function such as content viewing based on a relationship between the first position set by the virtual sound source position setting unit 107 and the second position acquired by the reply acquisition unit 117. For example, when sound data is generated using the head-related transfer function of the user U, the determination unit 119 may determine that the HMD 20 is to be unlocked if the first position and the second position match. This is because a user correctly perceiving the position of the virtual sound source is estimated to be the user U himself or herself. Further, for example, when the sound data is generated using an average head-related transfer function of users having a common attribute, e.g., users who are "adults," the determination unit 119 may determine that the HMD 20 is to be unlocked if an error between the first position and the second position is within a predetermined range. This is because a user correctly perceiving the position of the virtual sound source to some extent is estimated to be an "adult" a predetermined age or older. The determination unit 119 outputs a result of the determination to the locking unit 121.

The locking unit 121 executes lock control of the HMD 20 based on the result of the determination in the determination unit 119. For example, when the determination unit 119 determines that the HMD 20 is to be unlocked, the locking unit 121 unlocks the HMD 20 to validate a content reproduction function of the HMD 20. On the other hand, when the determination unit 119 does not determine that the HMD is to be unlocked, the locking unit 121 continuously maintains a lock state leaving the content reproduction function of the HMD 20 invalid.

Further, among the components described above, components other than the components illustrated as specific members are realized, for example, by a CPU, a RAM (Random Access Memory), a ROM (Read Only Memory) and the like. The same applies to components that will be described in the following embodiments.

(Example of Position of Virtual Sound Source)

Figure 11:
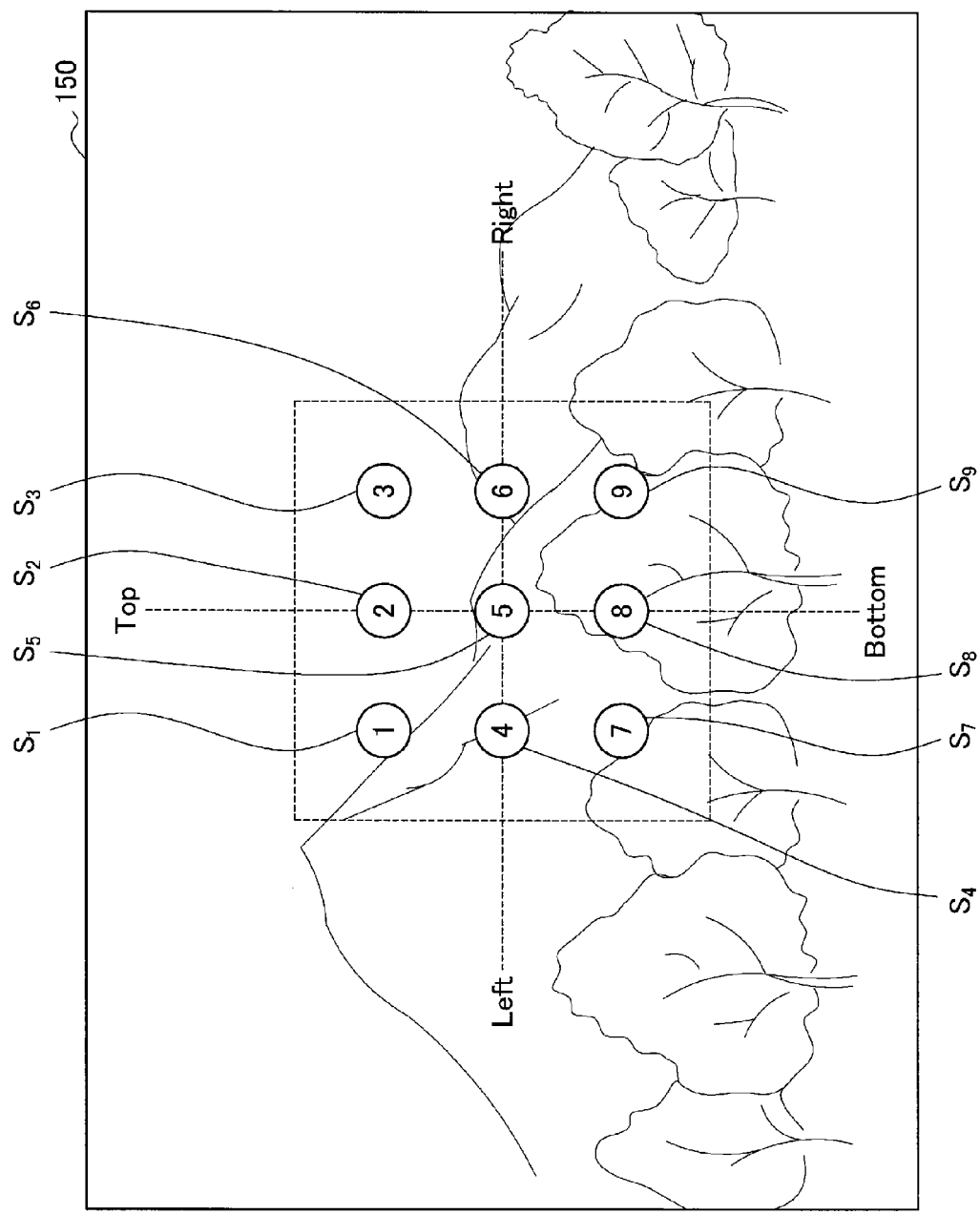
FIG. 11 is a diagram illustrating an example of a position of a virtual sound source in the first embodiment of the present disclosure.

FIG. 11 is a diagram illustrating an example of positions of a virtual sound source in the first embodiment of the present disclosure. Referring to FIG. 11, in the present embodiment, a virtual screen 150 is presented to an observer. The virtual screen 150 is a virtual screen recognized by the user for which an image is displayed toward right and left eyes of the user by the display units 22L and 22R of the HMD 20. On the virtual screen 150, a position $S_5$ is arranged at a center when viewed by the user, and positions $S_1$ to $S_4$ and positions $S_6$ to $S_9$ are arranged in top, bottom, left, right, top left, top right, bottom left and bottom right positions around the position $S_5$, respectively. As described above, in the present embodiment, the first position set by the virtual sound source position setting unit 107 is selected from among the nine positions. Further, in response thereto, the second position indicated by the reply of the user acquired by the reply acquisition unit 117 may also be selected from among the nine positions.

Thus, the head-related transfer function may be prepared in advance for a position included in at least a predetermined position group by selecting each of the first position and the second position from the predetermined position group, thereby simplifying the measurement or generation of the head-related transfer function. Further, the reply of the user estimating the position of the virtual sound source may be acquired by selection from options, thereby simplifying the input and the determination of the reply. Further, the number of positions included in the position group is not limited to 9 and may be any number.

Further, the positions $S_1$ to $S_9$ of the virtual sound source may be displayed as images on the virtual screen 150, as illustrated. As the positions $S_1$ to $S_9$ are displayed, the user may easily reply, for example, by inputting any of numbers "1" to "9" attached to the positions $S_1$ to $S_9$, respectively, when hearing the sound data and replying with the position of the virtual sound source. Further, the number may not be attached to the positions $S_1$ to $S_9$. In this case, the user may reply, for example, by inputting a direction corresponding to the position of the virtual sound source using the direction/menu button 23b of the manipulation unit 23.

Alternatively, the reply of the user may be acquired based on a result of detecting a line of sight or a gesture of the user. For example, a camera for detecting the line of sight of the user is installed in the HMD 20, and a position closest to a gazing point of the user when the sound data is reproduced may be acquired as a reply of the user. Further, for example, a camera for detecting the gesture of the user may be installed in a portion corresponding to a forehead of the user of the HMD 20 or in a position in which a user wearing the HMD 20 can be captured, and the reply of the user may be recognized from the gesture of the user when the sound data is reproduced. In this case, for example, a corresponding gesture may be set for each of the positions $S_1$ to $S_9$ in advance (e.g., when the position $S_1$ is replied, a left arm is stretched out to the side and a tip is turned up from an elbow). Further, since a well-known technology may be used for a configuration for detecting the line of sight of the user or a configuration for detecting the gesture of the user, a detailed description is omitted herein.

Figure 12:
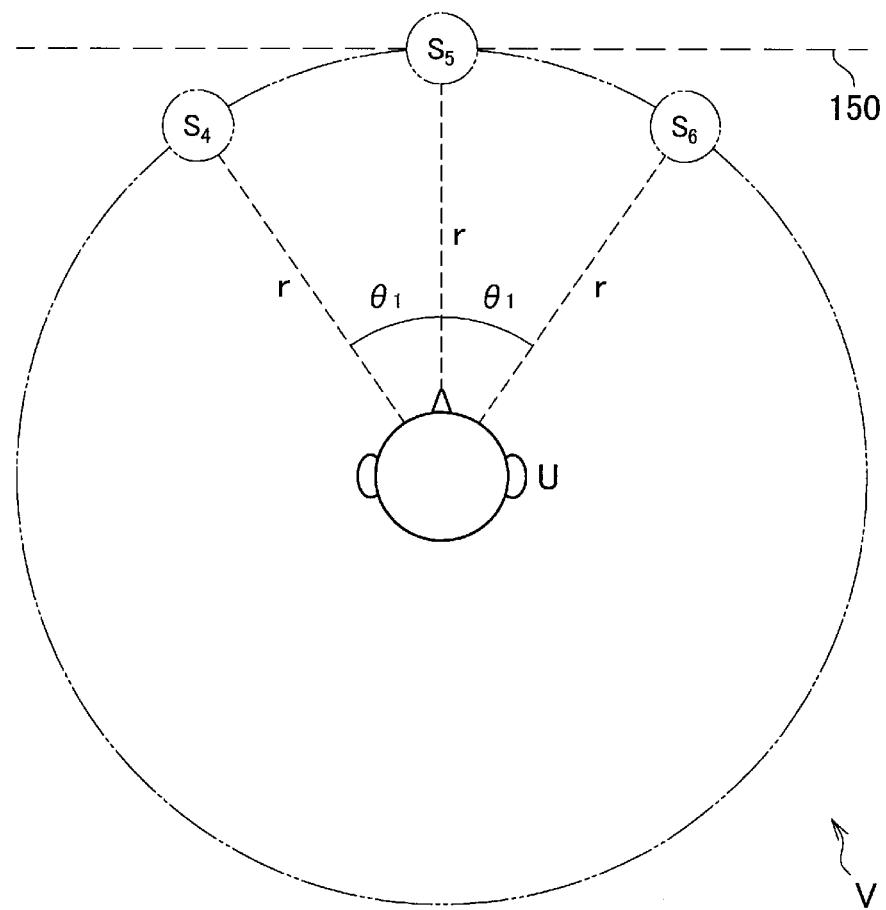
FIG. 12 is a diagram illustrating an arrangement in a horizontal direction of positions of the virtual sound source in the first embodiment of the present disclosure.

FIG. 12 is a diagram illustrating an arrangement in a horizontal direction of the positions of the virtual sound source in the first embodiment of the present disclosure. In FIG. 12, a horizontal cross-sectional view of the virtual three-dimensional acoustic space V around the user at a height of a head of the user is schematically shown. In the present embodiment, the positions of the virtual sound source are arranged on a virtual screen 150 at a distance r in a front of the user. The distance r may be set to be the same as a virtual viewing distance of the HMD 20, namely, a virtual distance from the user U to the virtual screen 150. For example, when the virtual viewing distance is 20 m, the distance r may be 20 m.

In an illustrated example, a position $S_5$ of the virtual sound source is (r, 0, 0) in the three-dimensional acoustic space V. Further, a position $S_4$ of the virtual sound source is (r, -$theta_1$, 0) in the three-dimensional acoustic space V, and a position $S_6$ of the virtual sound source is (r, $theta_1$, 0). Accordingly, a distance between either the position $S_4$ and the position $S_5$ or the position $S_5$ and the position $S_6$ is $r*tan\ theta_1$.

In this case, a distance from a viewpoint of the user to the position $S_4$ and the position $S_6$ set on the virtual screen 150 is slightly greater than r, but for example, when r is about 20 m and $theta_1$ is about 3 degrees to 5 degrees, a difference therebetween is in a range that may be neglected as an error. When the distance from the viewpoint of the user to the position $S_4$ and the position $S_6$ on the virtual screen 150 is exactly r, the virtual viewing distance of the HMD 20, i.e., the virtual distance (e.g., 20 m) from the user to the position $S_5$, is $r*costheta_1$ and the distance between the position $S_4$ and the position $S_5$ and the distance between the position $S_5$ and the position $S_6$ may be set to $r*sintheta_1$.

Figure 13:
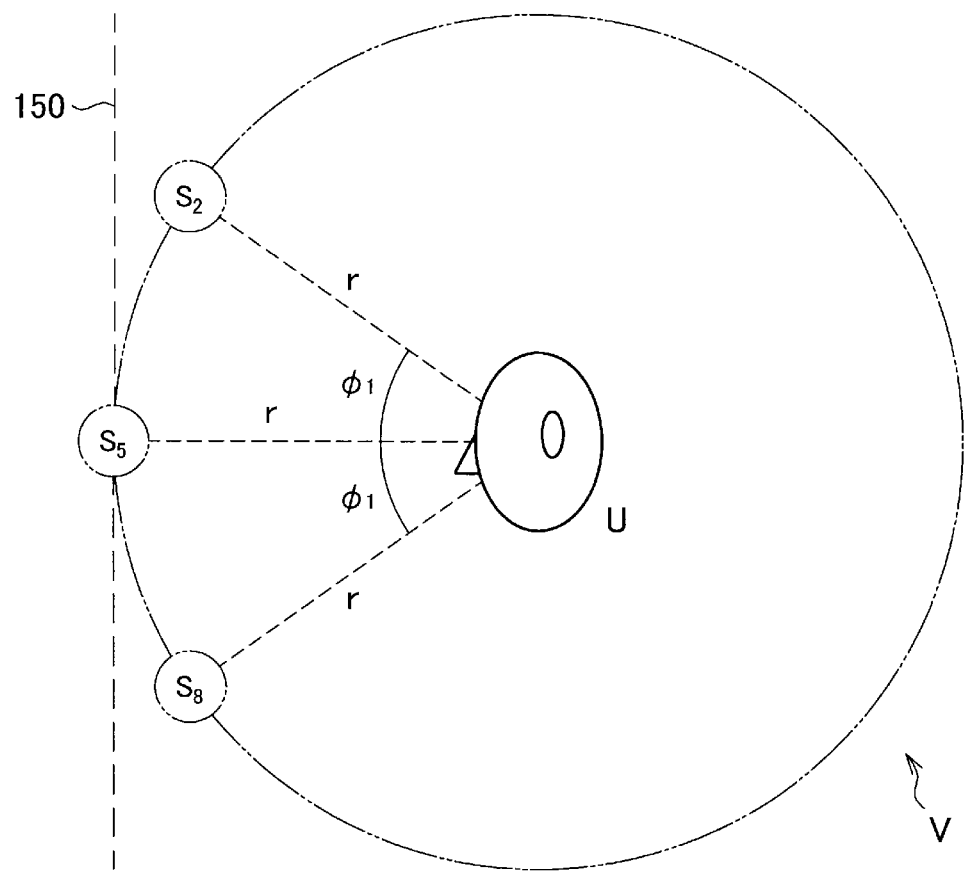
FIG. 13 is a diagram illustrating an arrangement in a vertical direction of the positions of the virtual sound source in the first embodiment of the present disclosure.

FIG. 13 is a diagram illustrating an arrangement in a vertical direction of the positions of the virtual sound source in the first embodiment of the present disclosure. In FIG. 13, a vertical cross-sectional view of the virtual three-dimensional acoustic space V around the user in a front-back direction of the user is shown schematically. As described above, in the present embodiment, the positions of the virtual sound source are arranged on the virtual screen 150 at the distance r in front of the user, and the distance r may be set to be the same as the virtual viewing distance of the HMD 20.

In an illustrated example, a position Ss of the virtual sound source is (r, 0, 0) in the three-dimensional acoustic space V. Further, a position $S_2$ of the virtual sound source is (r, 0, $phi_1$) in the three-dimensional acoustic space V, and a position $S_8$ of the virtual sound source is (r, 0, -$phi_1$). Accordingly, a distance between the position $S_2$ and the position $S_5$ and a distance between the position $S_5$ and the position $S_8$ is $r*tanphi_1$. In this case, the distance from the viewpoint of the user to the position $S_2$ and the position $S_8$ set on the virtual screen 150 is slightly greater than r, but for example, when r is about 20 m and $phi_1$ is about 3 degrees to 5 degrees, a difference therebetween may be neglected as an error. When the distance from the viewpoint of the user to the position $S_2$ and the position $S_8$ on the virtual screen 150 is exactly r, the virtual viewing distance of the HMD 20, i.e., the virtual distance (e.g., 20 m) from the user to the position $S_5$ is $r*cos\ theta_1$ and the distance between the position $S_2$ and the position $S_5$ and the distance between the position $S_5$ and the position $S_8$ may be set to $r*sintheta_1$.

Positions in the three-dimensional acoustic space V of positions $S_1$, $S_3$, $S_7$ and $S_9$, which are not illustrated, are set similarly to the positions $S_2$, $S_4$ to $S_6$ and $S_8$ described above. In other words, the position $S_1$ is (r, -$theta_1$, $phi_1$), the position $S_3$ is (r, $theta_1$, $phi_1$), the position $S_7$ is (r, -$theta_1$, -$phi_1$), and the position $S_9$ is (r, $theta_1$, -$Phi_1$).

In the above example, a minimum value (minimum resolution) of $theta_1$ and $phi_1$ that allow a user to identify a difference between the positions of the virtual sound source is about 3 degrees. If the values of $theta_1$ and $phi_1$ are too great, the difference between the positions of the sound source may be identified by people other than the user U, and accordingly, it is desirable for the values of $theta_1$ and $phi_1$ to be about 3 degrees to about 5 degrees. Further, when the virtual sound source is reproduced using the average head-related transfer function of a user group having a common attribute, accuracy of identification of the position of the virtual sound source by the user is not very high and it is desirable for each user belonging to the user group to be able to identify the same position of the virtual sound source, and accordingly, the values of $theta_1$ and $phi_1$ may be set, for example, to values greater than 5 degrees.

(Process Flow)

Figure 14:
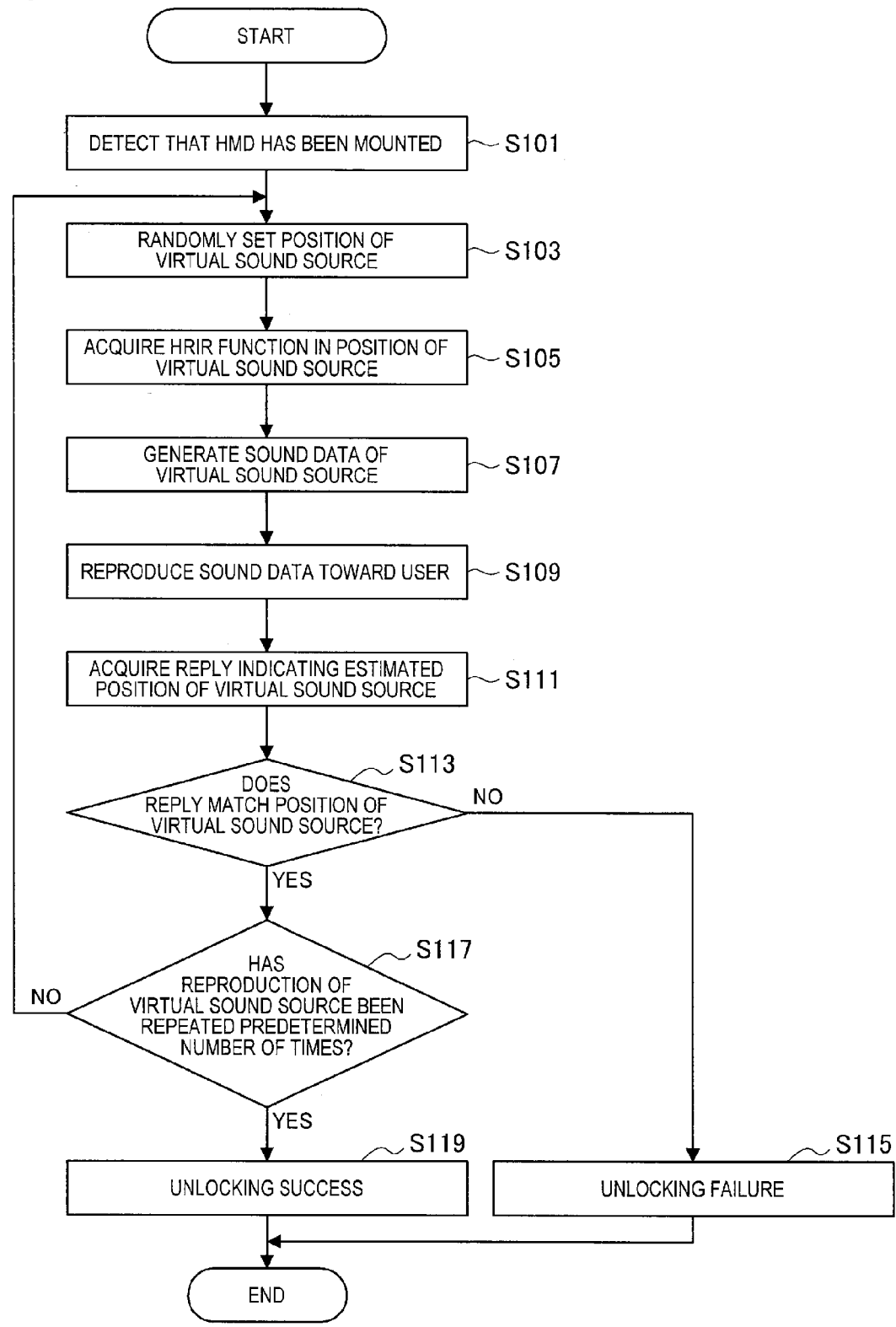
FIG. 14 is a flowchart illustrating an example of a lock control process in the first embodiment of the present disclosure.

FIG. 14 is a flowchart illustrating an example of a lock control process in the first embodiment of the present disclosure.

As described above, in the present embodiment, in the function control apparatus 100, an unlocking process starts as the mounting detection unit 101 detects that the HMD 20 has been mounted by a user (step S101). First, the virtual sound source position setting unit 107 randomly sets the position of the virtual sound source (step S103). Here, the virtual sound source position setting unit 107 randomly selects the position of the virtual sound source from among the above-described positions $S_1$ to $S_9$.

Next, the head-related transfer function acquisition unit 103 acquires an HRIR function in the position of the virtual sound source set in step S103 from data stored as the head-related transfer function data 105 in advance (step S105). Here, the acquired HRIR function may be, for example, an HRIR function measured for a specific user in advance or may be an HRIR function provided as an average head-related transfer function of users having a predetermined attribute.

Then, the generation unit 109 generates sound data of the virtual sound source by performing convolution of the HRIR function acquired in step S105 with original sound data (step S107). Then, the reproduction unit 115 outputs the sound data to the user through the headphone 21 of the HMD 20 (step S109).

Then, the reply acquisition unit 117 acquires a reply indicating the position of the virtual sound source estimated by the user via the manipulation unit 23 of the HMD 20 (step S111). Here, a predetermined standby time may be set in consideration of a time taken for a thought and operation of the user between step S109 and step S111.

Then, the determination unit 119 determines whether the position indicated by the reply acquired in step S111 (a second position) matches the position of the virtual sound source set in step S103 (a first position) (step S113). Here, when it is not determined that the positions match, the determination unit 119 determines "unlocking failure" and the locking unit 121 does not unlock the HMD 20 leaving the function invalid (step S115).

On the other hand, when it is determined in step S113 that the position indicated by the reply matches the position of the virtual sound source, the determination unit 119 further determines whether the reproduction of the virtual sound source in steps S103 to S109 has been repeated a predetermined number of times (step S117). Here, when it is determined that the reproduction of the virtual sound source has been repeated a predetermined number of times, the determination unit 119 determines "unlocking success" and the locking unit 121 unlocks the HMD 20 to validate the function (step S119).

On the other hand, when it is not determined in step S117 that the reproduction of the virtual sound source has been repeated a predetermined number of times, a process of reproducing the virtual sound source from step S103 is executed again. In this case, the position of the virtual sound source may be randomly set again in step S103. Further, the predetermined number of times may be 1 and, in this case, step S117 is not executed.

In the illustrated example, the reproduction of the virtual sound source and the acquisition of the reply from the user are repeated a predetermined number of times while changing the position of the virtual sound source (although the same positions may be consecutive as a result of the random selection). Accordingly, for example, it is possible to prevent a situation in which unlocking is accidentally performed when a child whose use of the HMD 20 is desired to be prevented inputs a reply by guessing.

Figure 15:
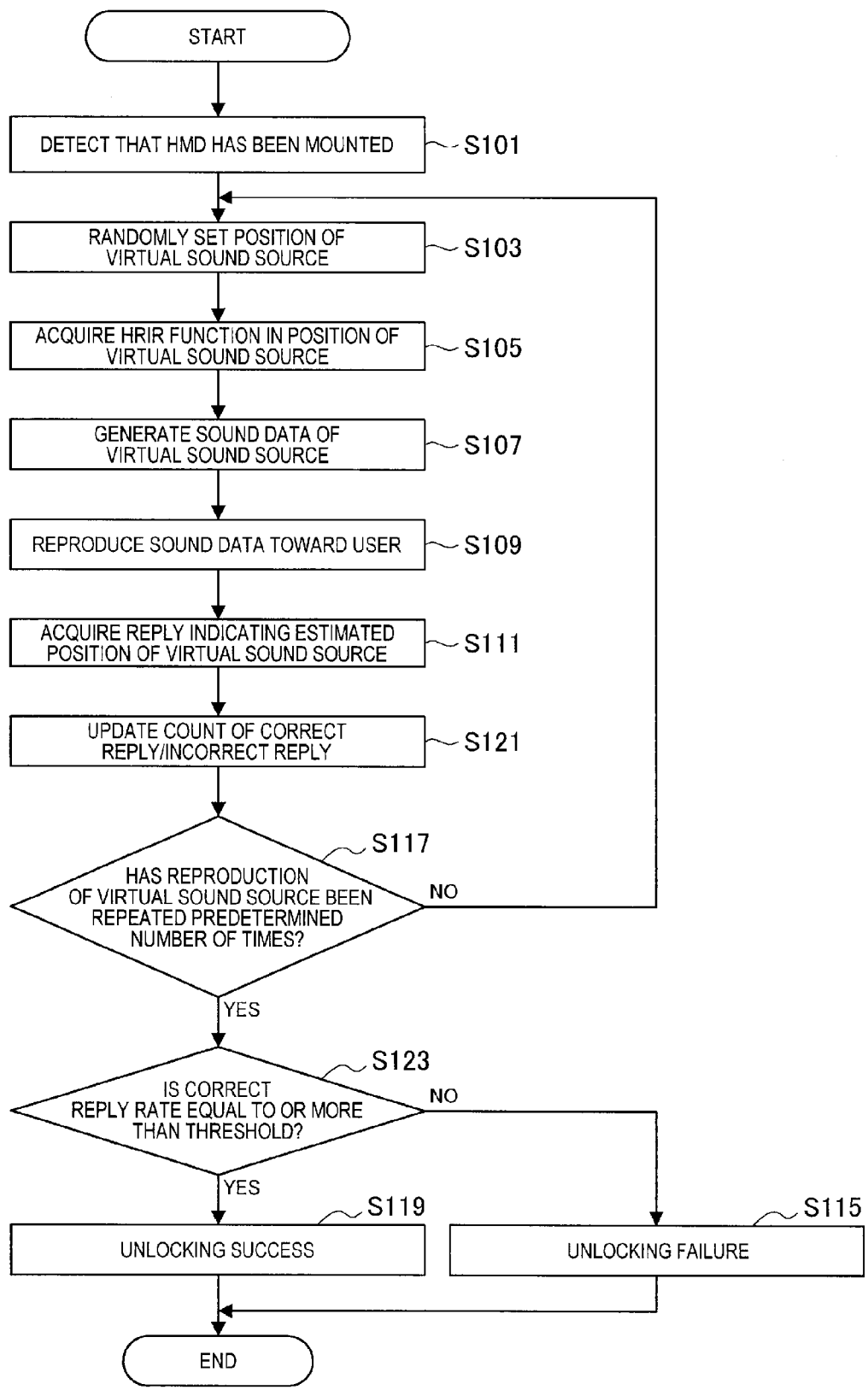
FIG. 15 is a flowchart illustrating a variant of the process shown in FIG. 14.

FIG. 15 is a flowchart illustrating a variant of the process shown in FIG. 14.

In an illustrated example, after step S111, the determination unit 119 determines whether the acquired reply is a correct reply or an incorrect reply and updates a count of the correct replies/incorrect replies (step S121). The count may be stored, for example, as a numerical value in a RAM or the like. The determination unit 119 then executes step S117.

When it is determined in step S117 that the reproduction of the virtual sound source has been repeated a predetermined number of times, the determination unit 119 calculates the number of correct replies of the listener from the predetermined number of times and the count of the correct replies/incorrect replies, and determines whether the number of correct replies or a correct reply rate is equal to or more than a threshold (step S123). Here, when it is determined that the number of correct replies or the correct reply rate is equal to or more than the threshold, the determination unit 119 determines "unlocking success" and the locking unit 121 unlocks the HMD 20 to validate the function (step S119). On the other hand, when it is not determined that the number of correct replies or the correct reply rate is equal to or more than the threshold, the determination unit 119 determines "unlocking failure" and the locking unit 121 does not unlock the HMD 20 leaving the function invalid (step S115).

In the variant described above, unlocking does not immediately fail, for example, when there is one incorrect reply during the repetition of the reproduction of the virtual sound source, and the unlocking is likely to occur when the correct reply is subsequently made. Accordingly, even when the position of the virtual sound source is not necessarily exactly perceivable every time due to incompleteness of the HRIR function or the headphone 21 or use of the average HRIR function, it is possible to prevent unlocking by a user himself or herself or a user having a predetermined attribute from failing.

Here, as an additional configuration, the determination unit 119 may increase the number of times to repeat the reproduction of the virtual sound source when the incorrect reply is detected in step S121. For example, the determination unit 119 may dynamically set the number of times to repeat the reproduction of the virtual sound source on condition that "correct reply is made three consecutive times from the beginning or after an incorrect reply" or "the reproduction of the virtual sound source is repeated three times or more, and unlocking success is determined if a correct reply rate is 75% or more on the way and unlocking failure is determined if the correct reply rate is less than 50%."

(Measurement of Head-Related Transfer Function)

In the first embodiment of the present disclosure described above, the head-related transfer function data 105 is stored in the function control apparatus 100 in advance. For example, when the head-related transfer function specific to the user U is used for the above-described unlocking process, the head-related transfer function is measured for the user U in advance, for example, using the scheme as described with reference to FIG. 3. In order to acquire a high-precision head-related transfer function, it is desirable to perform the measurement in an anechoic space to remove an influence of reflection on walls. When the head-related transfer function such as the HRIR is acquired by such measurement, any sound as well as the impulse or the TSP (Time-Stretched Pulse) used at the time of the measurement may be used as the original sound data 111.

However, it is not practical for all users of the HMD 20 to measure the head-related transfer function in the anechoic space. Therefore, some alternative schemes may be considered. One is to use an average head-related transfer function of users having a predetermined attribute (e.g., users who are "adults") as the head-related transfer function, as described above. In this case, the head-related transfer function is calculated, for example, based on a result of measuring head-related transfer functions of a sufficient number of samples in the anechoic space. Therefore, a user of the HMD 20 himself or herself may not measure the head-related transfer function. However, for example, when an average difference is great between shapes of heads of users, the users may not be recognized as having such an attribute.

Further, the measurement may be performed at a place in which a user uses the HMD 20, such as at home. In this case, for example, a microphone for noise canceling provided in the same position as the headphone 21 of the HMD 20 may be used for the measurement. In the case of a home, since it is not easy to move the position of the sound source unlike a dedicated measurement environment, measurement at a plurality of different sound source positions may be performed, for example, through a movement of a user in a state in which a sound source such as a speaker is fixed to a predetermined position. In this case, in order for the user to be able to move to a correct position, a sheet or the like specifying a positional relationship with the sound source may be included in the HMD 20. Alternatively, the measurement may be performed in a state in which a positional relationship between the sound source and the HMD 20 is specified, by installing a speaker in a portion corresponding to a forehead of the user of the HMD 20 or attaching the speaker with a string to the HMD 20 and moving the speaker in a state in which the string is stretched out.

When the measurement is simplified as described above, an influence of reflection or absorption on walls on a measurement result increases. Further, the accuracy of the position of the sound source at the time of the measurement is not high since the position of the sound source is set according to a movement and a manipulation of the user. Therefore, it may be difficult to acquire the head-related transfer function such as an appropriate HRIR according to a measurement situation. In this case, a heard sound of the user, i.e., a sound wave changing according to the head-related transfer function, may be measured instead of the head-related transfer function. If a sound wave recorded near an eardrum of the user when the sound source has been arranged in a certain position is reproduced near the same eardrum at other times, the user perceives the sound source virtually localized in the position. However, in this case, original sound used at the time of unlocking processing is the same as the sound reproduced at the time of the measurement.

Figure 16:
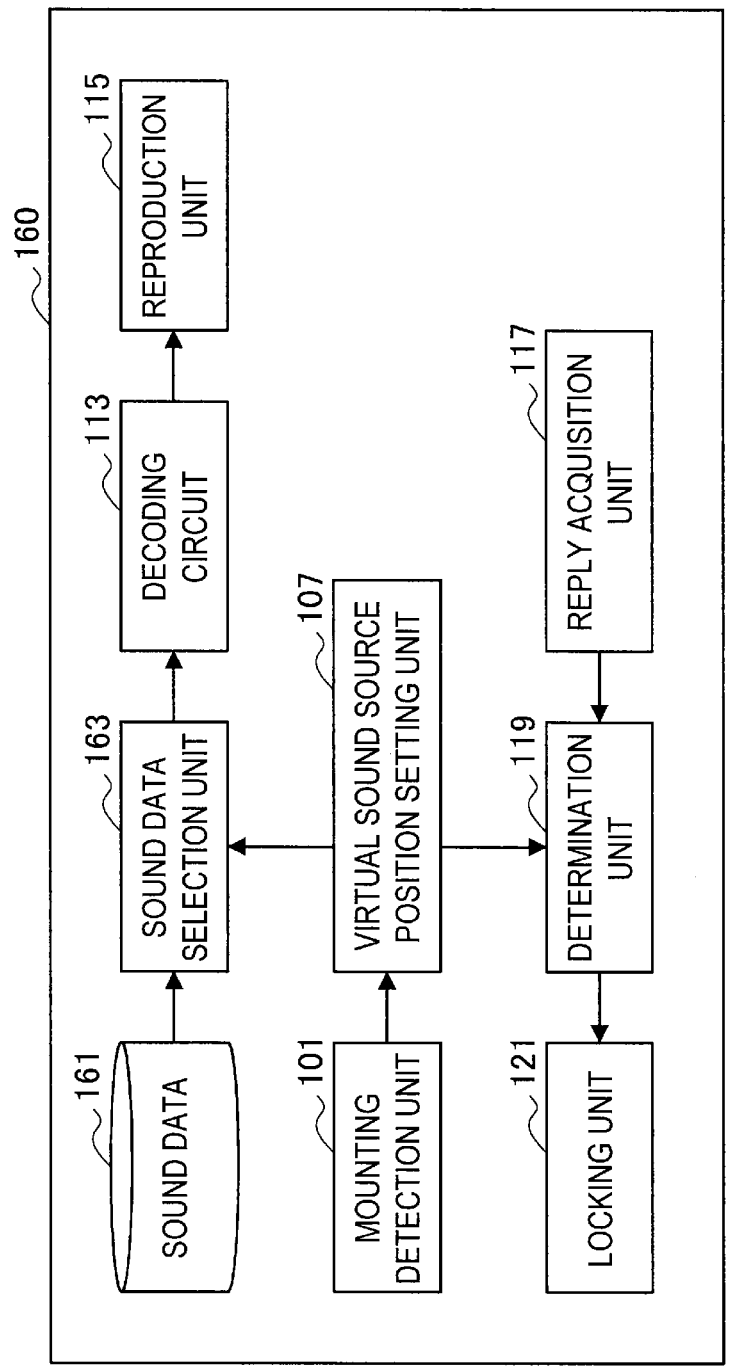
FIG. 16 is a block diagram illustrating a schematic functional configuration of a function control apparatus according to a variant of the first embodiment of the present disclosure.

FIG. 16 is a block diagram illustrating a schematic functional configuration of the function control apparatus according to a variant of the first embodiment of the present disclosure. In this variant, a heard sound of a user is measured in advance instead of a head-related transfer function. Referring to FIG. 16, the function control apparatus 160 includes a mounting detection unit 101, a virtual sound source position setting unit 107, a sound data selection unit 163, a decoding circuit 113, a reproduction unit 115, a reply acquisition unit 117, a determination unit 119, and a locking unit 121. Further, the function control apparatus 160 refers to sound data 161 stored in a storage device or the like. Hereinafter, the function control apparatus 160 will be described in connection with a difference with the function control apparatus 100 shown in FIG. 10 described above.

In the function control apparatus 160, the virtual sound source position setting unit 107 provides information of a first set position to the sound data selection unit 163 and the determination unit 119. The sound data selection unit 163 selects sound data measured by localizing a sound source in the first set position from a sound data group measured by localizing the sound source in a predetermined group of positions of a virtual acoustic space V with reference to the sound data 161. The acquired sound data is decoded by the decoding circuit 113 and reproduced by the reproduction unit 115. Thus, in the function control apparatus 160, for example, a function such as that of the generation unit 109 of the function control apparatus 100 shown in FIG. 10 described above is not necessary since stored data is sound data in which a head-related transfer function has already been reflected.

(2-2. Second Embodiment)

Next, a second embodiment of the present disclosure will be described with reference to FIGS. 17 to 20. The present embodiment differs from the first embodiment described above in that the position of the virtual sound source continuously moves during reproduction. Since the present embodiment is similar to the first embodiment in other points, a detailed description thereof is omitted.

(Configuration of Function Control Apparatus)

Figure 17:
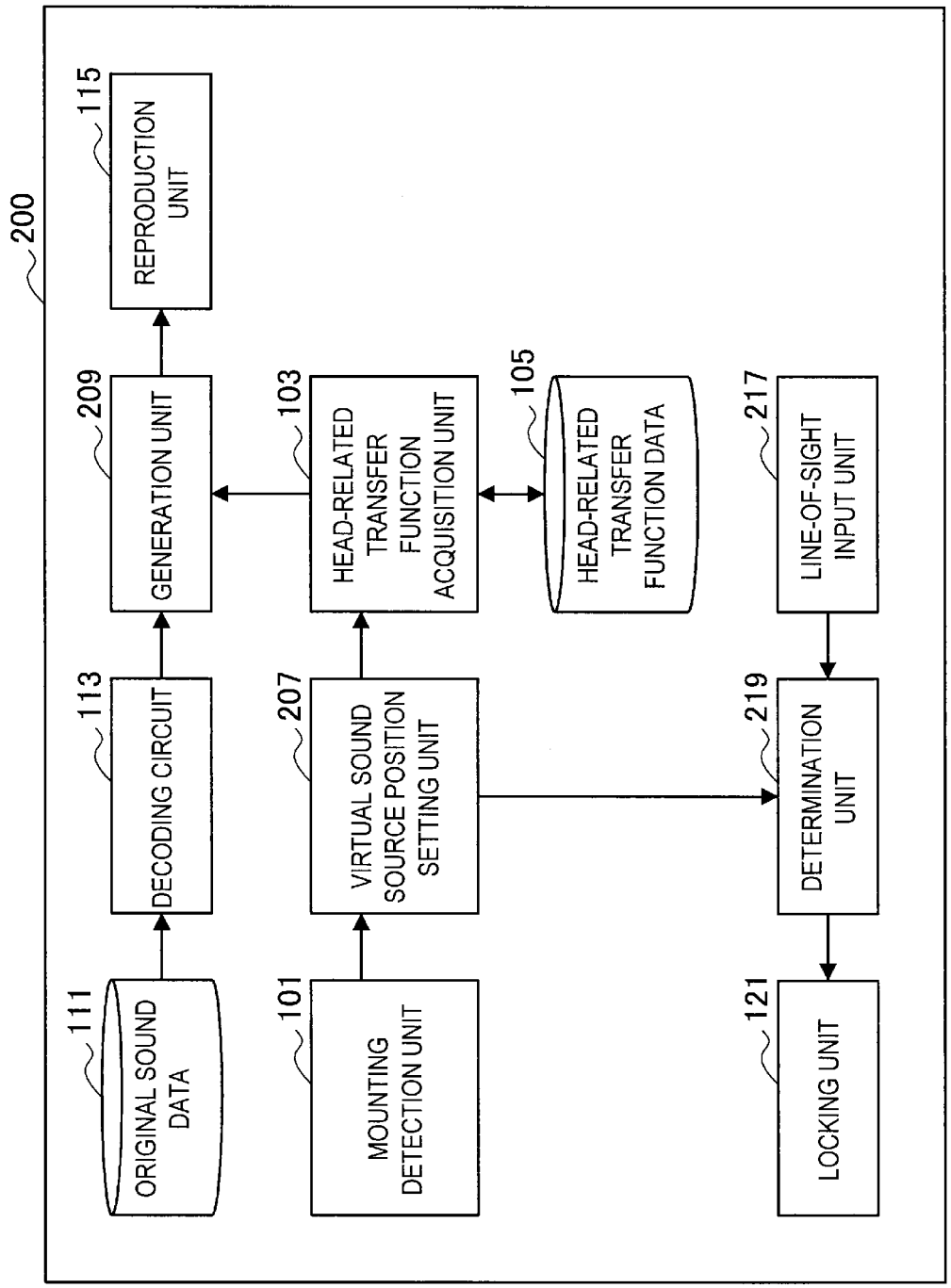
FIG. 17 is a block diagram illustrating a schematic functional configuration of a function control apparatus according to a second embodiment of the present disclosure.

FIG. 17 is a block diagram illustrating a schematic functional configuration of a function control apparatus according to a second embodiment of the present disclosure. Referring to FIG. 17, a function control apparatus 200 includes a mounting detection unit 101, a head-related transfer function acquisition unit 103, a virtual sound source position setting unit 207, a generation unit 209, a decoding circuit 113, a reproduction unit 115, a line-of-sight input unit 217, a determination unit 219, and a locking unit 121. Further, the function control apparatus 200 refers to head-related transfer function data 105 and original sound data 111 stored in a storage device or the like. Hereinafter, the function control apparatus 200 will be described in connection with a difference between the function control apparatus 200 and the function control apparatus according to the first embodiment described above.

In the function control apparatus 200, the virtual sound source position setting unit 207 sets a first position as a locus. In other words, the virtual sound source position setting unit 207 sets a position of a continuously moving virtual sound source during reproduction of sound data. The head-related transfer function acquisition unit 103 acquires a head-related transfer function from the head-related transfer function data 105 for each position (r, theta, phi) included in the locus of the first position, and provides the head-related transfer function to the generation unit 209. The generation unit 209 generates sound data obtained by virtually reproducing the sound source moving in the three-dimensional acoustic space V using the provided head-related transfer function. More specifically, the generation unit 209 generates the sound data obtained by virtually reproducing the moving sound source by processing data of the original sound using a different head-related transfer function each time during the reproduction of the sound data.

The line-of-sight input unit 217 continuously acquires a result of detecting a line of sight of the user hearing the sound data reproduced by the reproduction unit 115. In other words, the line-of-sight input unit 217 acquires a movement locus of the line of sight of the user. The movement locus of the line of sight is treated as a reply indicating the locus of the sound source estimated by the user hearing the sound data obtained by virtually reproducing the moving sound source, namely, as a locus of the second position. For the detection of the line of sight of the user, for example, cameras arranged in the HMD 20 to recognize the left eye and the right eye of the user may be used. In this case, the line of sight (gazing point) of the user may be identified, for example, by recognizing a region of the iris and the white of the eyes of the user from an image of the camera and determining where the iris of the eyes is directed. Further, in addition to this example, various well-known technologies may also be used as the configuration for detecting the line of sight of the user.

The determination unit 219 determines whether the HMD 20 is to be unlocked to validate a function such as content viewing based on a relationship between the locus of the first position set by the virtual sound source position setting unit 207 and the locus of the second position acquired by the line-of-sight input unit 217. For example, the determination unit 219 may determine that the HMD 20 is to be unlocked if the locus of the first position matches the locus of the second position when the sound data is generated using the head-related transfer function of the user U. Further, for example, the determination unit 219 may determine that the HMD 20 is to be unlocked if an error between the locus of the first position and the locus of the second position is within a predetermined range when the sound data is generated using the average head-related transfer function of the users having a common attribute. Here, for example, well-known technology used for pattern recognition of a two-dimensional figure may be used for the matching of the loci and evaluation of the error between the loci.

(Example of Locus of Virtual Sound Source)

Figure 18:
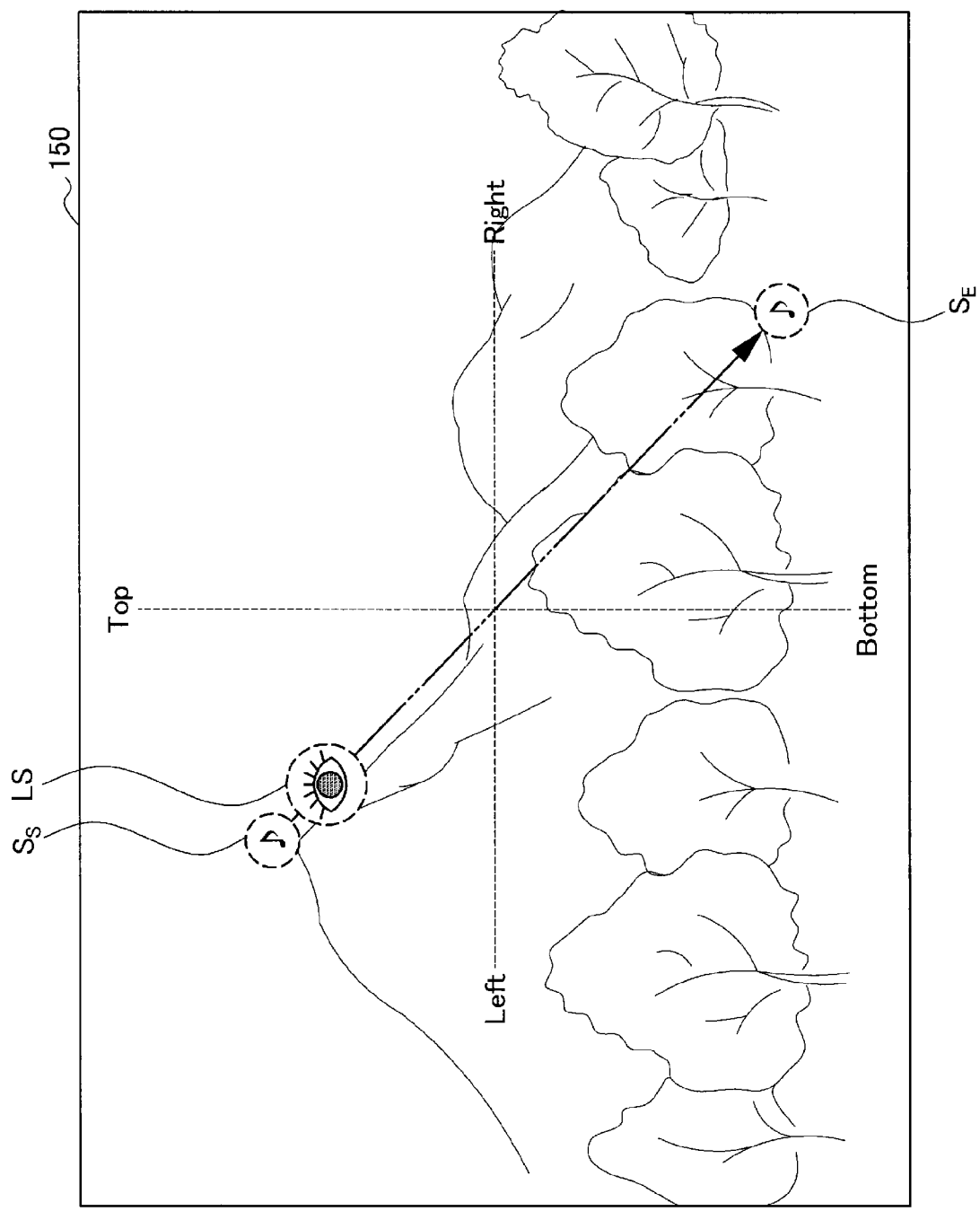
FIG. 18 is a diagram illustrating an example of a locus of a virtual sound source in the second embodiment of the present disclosure.

FIG. 18 is a diagram illustrating an example of the locus of the virtual sound source in the second embodiment of the present disclosure. Referring to FIG. 18, in the present embodiment, a virtual screen 150 similar to that in the first embodiment described above is presented to an observer. In the illustrated example, the locus of the virtual sound source is set as a straight line in an oblique direction from an upper left position $S_S$ to a lower right position $S_E$, when viewed by a user, on the virtual screen 150. Upon hearing a sound, the user follows a position on the virtual screen 150 in which the sound is localized with his or her eyes. If the user can correctly perceive the position of the virtual sound source, the locus of the line of sight LS may match or be close to the locus of the virtual sound source.

In the present embodiment, it is determined whether the user correctly perceives the position of the virtual sound source using the locus in this way. Since the determination based on a shape of the locus of the line of sight is possible, a coordinate system of the virtual sound source set on the virtual screen 150 and a coordinate system of the line of sight of the user acquired by a mechanism such as a camera may not exactly match. In other words, in the illustrated example, it may be determined that the user correctly perceives the position of the virtual sound source if the line of sight LS draws a locus from an upper left region to a lower right region when viewed by the user, even when the line of sight LS does not exactly draw the locus from a position $S_S$ to a position $S_E$, in consideration of a deviation of the coordinate system or the like. Further, for a similar reason, an image for the position of the virtual sound source may not be displayed on the virtual screen 150.

Further, the locus of the virtual sound source to be set is not limited to the straight line as in the example described above. For example, any form allowing it to be easily identified that the user follows with his or her eyes, such as a Z form, an N form, an O form or an L form, may be set as the locus of the virtual sound source.

Further, in the present embodiment, for the user to easily recognize the locus of the virtual sound source, it is desirable for the head-related transfer function to be prepared for a number of points in a region in which the locus is set. For example, it is desirable for a position in which the head-related transfer function has been measured to be present at intervals of 3 degrees to 5 degrees of the deflection angles theta and phi shown in FIG. 1. As described above, the minimum resolution of the user for the deflection angles theta and phi is generally about 3 degrees.

As a variant of the present embodiment, the reply of the user may be acquired based on a result of detecting a gesture. For example, a camera for detecting the gesture of the user may be installed in a portion corresponding to a forehead of the user of the HMD 20 or in a position in which the user wearing the HMD 20 can be captured, to continuously acquire a result of detecting the gesture of the user when the sound data is reproduced. In this case, for example, a movement locus of a specific part (e.g., a hand, a finger or a foot) of a body of the user recognized as a gesture is treated as a locus of the second position. Further, since well-known technology may be used for the configuration for detecting the gesture of the user, a detailed description is omitted herein.

(Process Flow)

Figure 19:
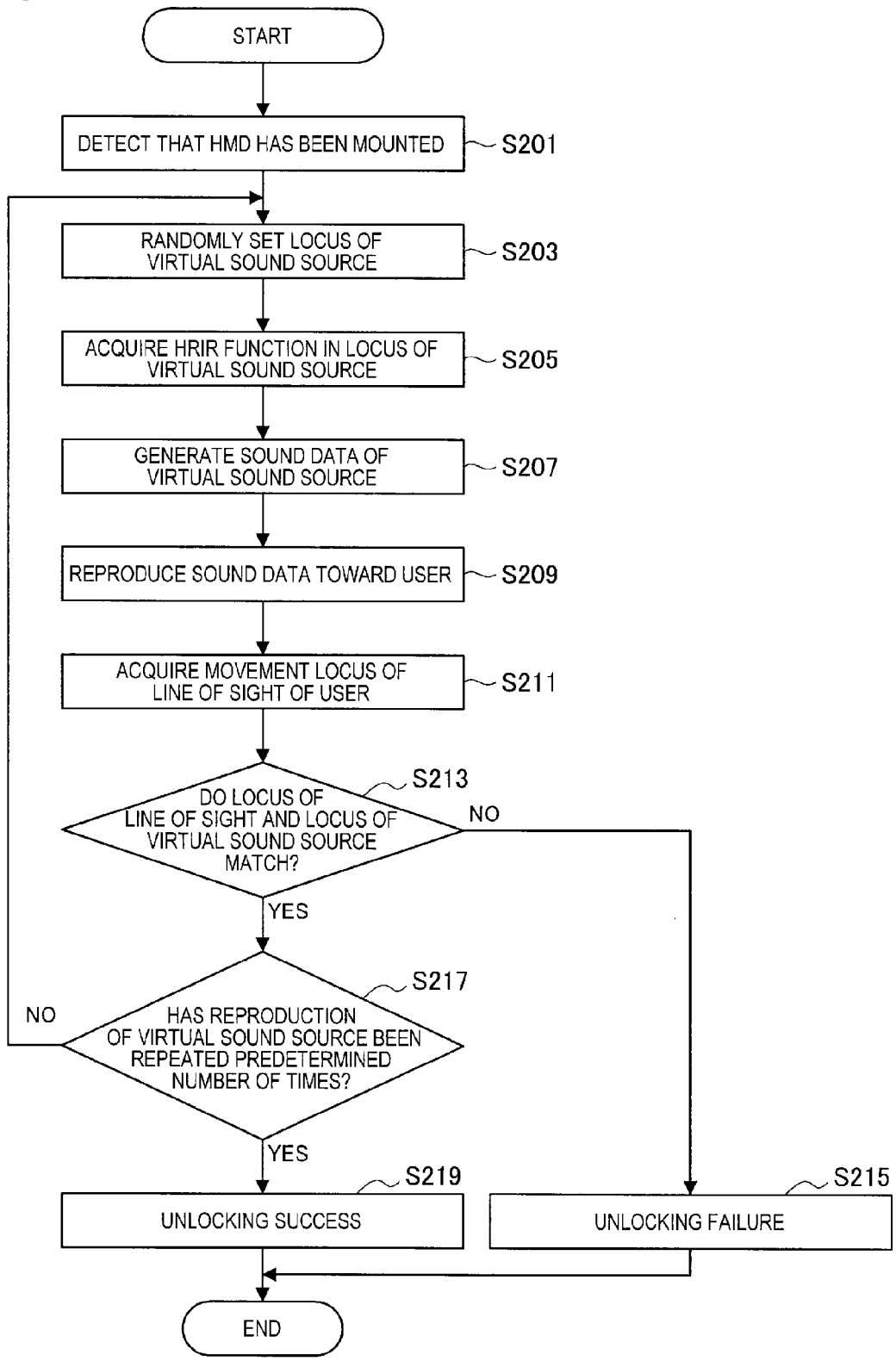
FIG. 19 is a flowchart illustrating an example of an unlocking process in the second embodiment the present disclosure.

FIG. 19 is a flowchart illustrating an example of an unlocking process in the second embodiment the present disclosure.

In the present embodiment, in the function control apparatus 200, an unlocking process starts as the mounting detection unit 101 detects that the HMD 20 has been mounted by a user, as in the first embodiment (step S201). First, the virtual sound source position setting unit 207 randomly sets the locus of the virtual sound source (step S203). Here, the virtual sound source position setting unit 207, for example, randomly selects the locus from among locus patterns prepared in advance.

Then, the head-related transfer function acquisition unit 103 acquires an HRIR function in each position included in the locus of the virtual sound source set in step S203 from among data stored as head-related transfer function data 105 in advance (step S205). Here, the acquired HRIR function may be, for example, an HRIR function measured in advance for a specific user and may be an HRIR function provided as an average head-related transfer function of users having a predetermined attribute.

Then, the generation unit 209 generates the sound data of the virtual sound source by performing convolution of the HRIR function acquired in step S205 with original sound data (step S207). Here, the generation unit 209 generates the sound data obtained by virtually reproducing a moving sound source by performing convolution of an HRIR function different each time with the original sound data. Then, the reproduction unit 115 outputs the sound data to the user through the headphone 21 of the HMD 20 (step S209).

Then, the line-of-sight input unit 217 acquires a movement locus of the line of sight of the user while the sound data is being reproduced (step S211). Here, between step S209 and step S211, a predetermined standby time may be set in consideration of a time taken for a reaction from a user hearing the sound to the line of sight being moved.

Then, the determination unit 219 determines whether the locus of the line of sight of the user acquired in step S211 matches the locus of the virtual sound source set in step S203 (step S213). Here, when it is not determined that the locus of the line of sight matches the locus of the virtual sound source, the determination unit 219 determines "unlocking failure" and the locking unit 121 does not unlock the HMD 20 leaving the function invalid (step S215).

On the other hand, when it is determined that the locus of the line of sight of the user matches the locus of the virtual sound source in step S213, the determination unit 219 determines whether the reproduction of the virtual sound source in steps S203 to S209 has been repeated a predetermined number of times (step S217). Here, when it is determined that the reproduction of the virtual sound source has been repeated a predetermined number of times, the determination unit 219 determines "unlocking success" and the locking unit 121 unlocks the HMD 20 to validate the function (step S219).

On the other hand, when it is not determined that the reproduction of the virtual sound source has been repeated a predetermined number of times in step S217, the process of reproducing the virtual sound source from step S203 is executed again. In this case, in step S203, the locus of the virtual sound source may be randomly set again. Further, the predetermined number of times may be 1, and in this case, step S217 is not executed.

In the illustrated example, the reproduction of the virtual sound source and the detection of the line of sight of the user are repeated a predetermined number of times while changing the locus of the virtual sound source (although the same locus may be used consecutively as a result of the random selection). Accordingly, for example, it is possible to prevent a situation in which unlocking is accidentally performed when a child whose use of the HMD 20 is desired to be prevented inputs the line of sight by guessing.

Figure 20:
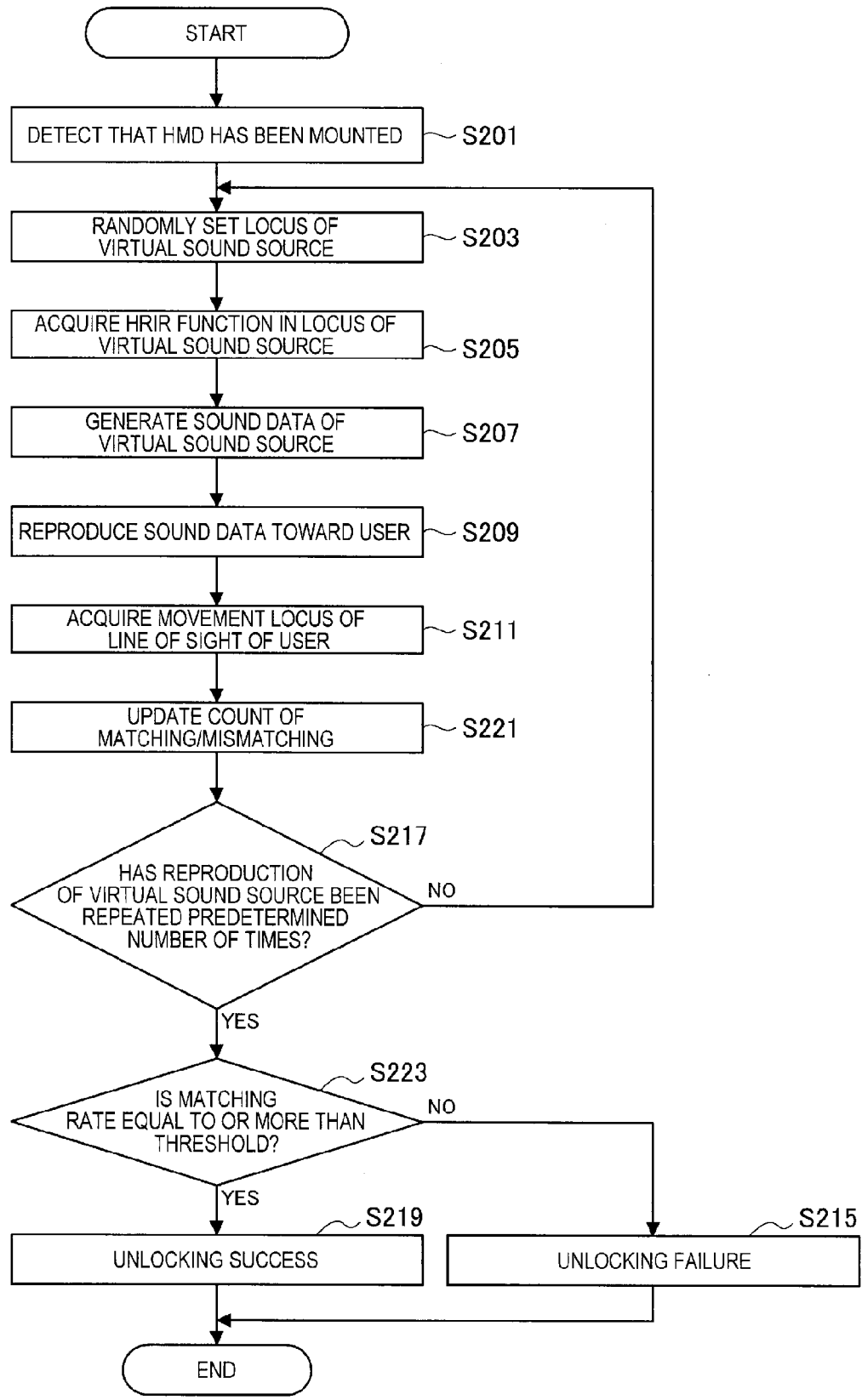
FIG. 20 is a flowchart illustrating a variant of the process shown in FIG. 19.

FIG. 20 is a flowchart illustrating a variant of the process shown in FIG. 19.

In an illustrated example, after step S211, the determination unit 219 determines whether the acquired locus of the line of sight matches the locus of the virtual sound source and updates a count of the matching/mismatching (step S221). The count may be stored, for example, as a numerical value in a RAM or the like. The determination unit 219 then executes step S217.

When it is determined in step S217 that the reproduction of the virtual sound source has been repeated a predetermined number of times, the determination unit 219 calculates the number of times of locus matching from the predetermined number of times and the matching/mismatching count and determines whether the number of times of matching or a matching rate is equal to or more than a threshold (step S223). Here, when it is determined that the number of times of matching or the matching rate is equal to or more than a threshold, the determination unit 219 determines "unlocking success" and the locking unit 121 unlocks the HMD 20 to validate the function (step S219). On the other hand, when it is not determined that the number of times of matching or the matching rate is equal to or more than the threshold, the determination unit 219 determines "unlocking failure" and the locking unit 121 does not unlock the HMD 20 leaving the functions invalid (step S215).

In the variant described above, unlocking does not immediately fail, for example, when there is one locus mismatching during the repetition of the reproduction of the virtual sound source, and the unlocking is likely to occur when the locus matching subsequently occurs. Accordingly, even when the locus of the virtual sound source is not necessarily exactly perceivable every time due to incompleteness of the HRIR function or the headphone 21 or use of the average HRIR function, it is possible to prevent unlocking by a user himself or herself or a user having a predetermined attribute from failing.

Here, as an additional configuration, the determination unit 219 may increase the number of times to repeat the reproduction of the virtual sound source when the incorrect reply is detected in step S221. For example, the determination unit 219 may dynamically set the number of times to repeat the reproduction of the virtual sound source on condition that "loci match three consecutive times from the beginning or after an incorrect reply" or "the reproduction of the virtual sound source is repeated three times or more, and unlocking success is determined if a correct reply rate is 75% or more on the way and unlocking failure is determined if the correct reply rate is less than 50%."

(Application Example)

In the present embodiment, the image may not be displayed on the virtual screen in unlocking using the virtual sound source. Using this, various application examples are possible.

For example, the present embodiment may be applied when an AR (Augmented Reality) application is used in the HMD. In the AR application, for example, various pieces of information are superimposed and displayed on an image of an external world viewed through transmission in a see-through type HMD or an image of an external world imaged using a camera mounted on a non-see-through type HMD.

Such an AR application includes an AR application that can be manipulated by the line of sight of the user. In this case, for example, when a user gazes at any one of pieces of displayed information, further detailed information on such information is presented. Further, for example, an icon for starting up another function such as transmission and reception of a message may be displayed on an edge of the screen separately from the information on the image of the external world, and the AR application may stop to start the other function by the user gazing at the icon.

In this case, when the other function has been set to immediately start up according to gazing of the user, malfunction is likely to occur. For example, when the user follows a moving object and moves the line of sight to the edge of the screen, a message function is likely to start up due to the line of sight accidentally hitting an icon for the message function displayed there. Then, although not intended, the AR application stops and the user feels discomfort. In order to prevent this, for example, displaying a confirmation dialog when gazing at the icon may be considered, but it may not be said that it is the best for the user since the display of the confirmation dialog also interferes with the AR application.

Here, application of the present embodiment is considered. For example, when the line of sight of the user hits an icon for another function such as a message during start-up of the AR application, the unlocking process as described above is executed. In other words, when the line of sight of the user hits the icon for a function, the virtual sound source is reproduced while moving along a predetermined locus. If the user really gazes at the icon with the intention of starting up of the function, the user may follow the locus of the virtual sound source with his or her eyes. Then, the function is validated by matching of the locus of the line of sight and the locus of the virtual sound source, and the AR application stops. On the other hand, if the user does not intend to start up the function, the user may neglect reproduced sound. Then, since the locus of the line of sight and the locus of the virtual sound source do not match, the function is not validated and the AR application is continuously executed.

According to the example described above, the user can confirm whether the other function is to start up without stopping the display of the AR application. Therefore, it is possible to comfortably enjoy the AR application while securing access to other functions through the display of the icon.

Similarly, the present embodiment may be applied to an AR application that may be manipulated by the gesture of the user. For example, there is an AR application that operates by recognizing the gesture of the user as a command using a camera provided in a portion corresponding to the forehead of the user of the HMD, or the like. In this case, for example, when a predetermined part of a body of the user such as the hand is recognized by the camera and a predetermined motion is performed, the AR application stops and another function such as transmission and reception of a message starts up.

In this case, if another function is set to start up immediately when the hand of the user is captured by the camera or a predetermined motion is performed, malfunction is likely to occur. For example, if the hand of the user is accidentally captured by the camera or a motion of the hand accidentally matches a predetermined motion when the user raises his or her hand to greet a friend, the AR application is likely to stop and another function such as a message function is likely to start up against the intention of the user. Like the example described above, correspondence of displaying a confirmation dialog may be considered, but it is not the best for a user to interfere with the indication of the AR application of the indication of the confirmation dialog.

Therefore, if the present embodiment is applied, the unlocking process as described above is executed, for example, when the hand of the user is captured by the camera or a predetermined motion of the hand is performed during start-up of the AR application. In other words, when the hand of the user or the motion of the hand is recognized, the virtual sound source is reproduced while moving along a predetermined locus. If the user really performs a gesture with the intention of the start-up of the function, the gesture of the hand should follow the locus of the virtual sound source. Then, the function is validated by matching of the locus of the hand of the user and the locus of the virtual sound source, and the AR application stops. On the other hand, if the user does not intend the start-up of the function, the user may neglect reproduced sound. Then, since the locus of the hand of the user and the locus of the virtual sound source do not match, the function is not validated and the AR application is continuously executed.

Further, a similar application example is possible in applications other than the AR application. For example, even in viewing of content of a movie or the like or in a game, a manipulation input using the line of sight or the gesture may be implemented. In this case, for example, the unlocking process as described above may be executed in order to really confirm whether the function is to really start up when execution of a command input by the line of sight or the gesture (gazing of a predetermined position within the screen, detection of an image of the hand or the like of the user, a predetermined detected motion of the hand, or the like) is accompanied by stop of viewing of content or playing of the game.

Here, if sound not related at all is reproduced as the virtual sound source when viewing of provided content or an application such as a game is accompanied by sound, interfering with the application may be considered. Therefore, for example, the sound of the application may be temporarily monaurally reproduced and the sound itself may be reproduced as the virtual sound source along a predetermined locus. By doing so, the unlocking process can be executed without sound other than the sound of the application being mixed. Further, it is desirable to prepare for an environment for measurement and acquire the head-related transfer function with high precision in order to execute the reproduction of the virtual sound source using any sound source, as described above.

(2-3. Third Embodiment)

Next, a third embodiment of the present disclosure will be described with reference to FIGS. 21 and 22. The present embodiment differs from the first and second embodiments described above in that the virtual sound source is reproduced for any selected user attribute. Since the present embodiment is similar to the first embodiment or the second embodiment in other points, a detailed description thereof is omitted. Further, in the following description, an example based on the first embodiment will be described, but an example based on the second embodiment is similarly possible.

(Configuration of Function Control Apparatus)

Figure 21:
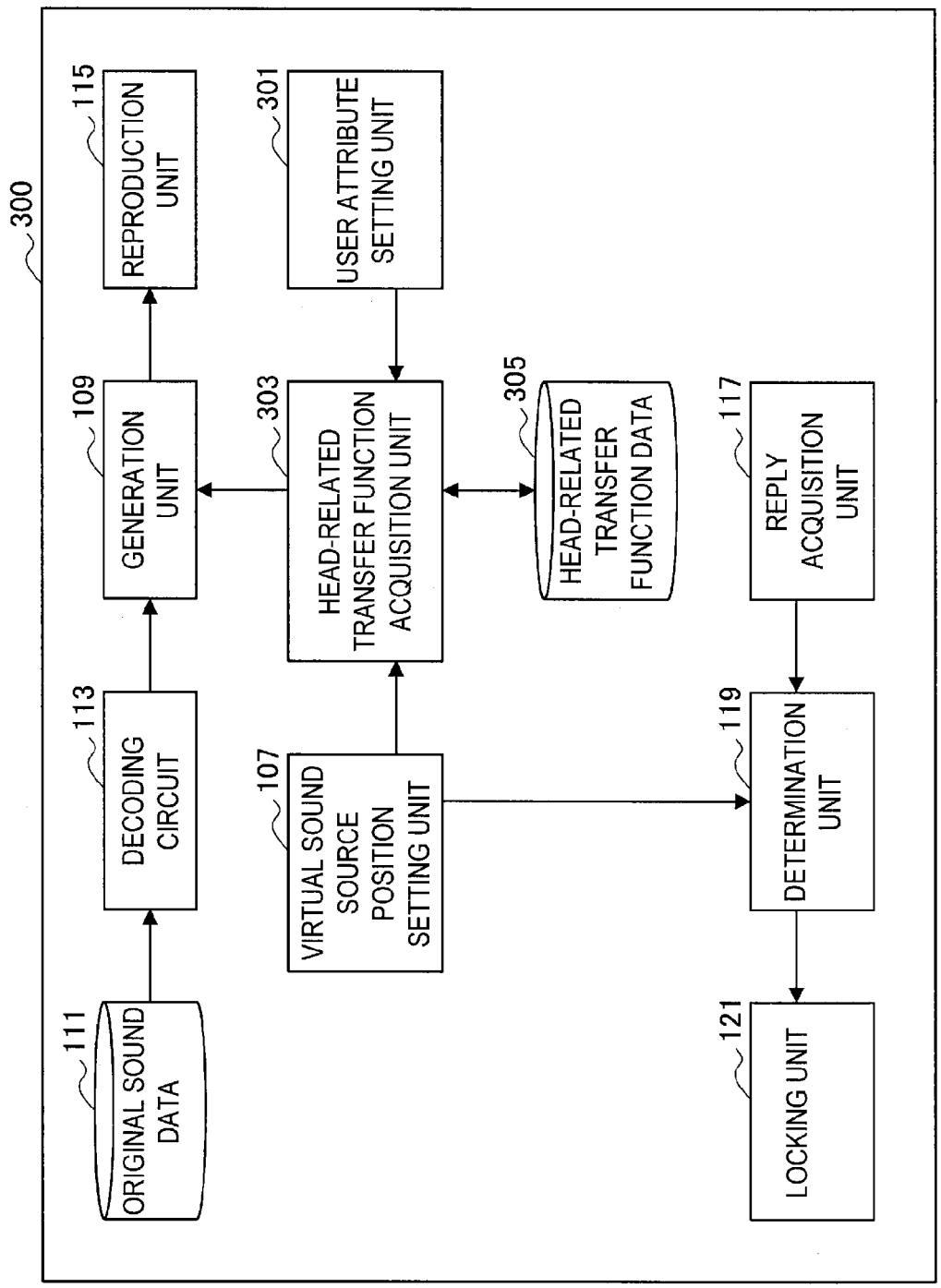
FIG. 21 is a block diagram illustrating a schematic configuration of a function control apparatus according to a third embodiment of the present disclosure.

FIG. 21 is a block diagram illustrating a schematic configuration of a function control apparatus according to the third embodiment of the present disclosure. Referring to FIG. 21, the function control apparatus 300 includes a user attribute setting unit 301, a head-related transfer function acquisition unit 303, a virtual sound source position setting unit 107, a generation unit 109, a decoding circuit 113, a reproduction unit 115, a reply acquisition unit 117, a determination unit 119, and a locking unit 121. Further, the function control apparatus 300 refers to head-related transfer function data 305 and original sound data 111 stored in a storage device or the like. Hereinafter, the function control apparatus 300 will be described in connection with a difference between the function control apparatus 300 and the function control apparatus according to the first embodiment described above.

The user attribute setting unit 301 sets an attribute of a user used for unlocking and provides information of the set attribute to the head-related transfer function acquisition unit 303. The head-related transfer function acquisition unit 303 acquires a head-related transfer function associated with a designated attribute with reference to the head-related transfer function data 305. Here, the acquired head-related transfer function may be a head-related transfer function provided as an average head-related transfer function of a user group having a common attribute. In the present embodiment, the head-related transfer function data is prepared for a plurality of attributes in advance, and the head-related transfer function acquisition unit 303 selects the head-related transfer function corresponding to the attribute set by the user attribute setting unit 301 from among the plurality of attributes.

As a difference between the first and second embodiments described above and the present embodiment, unlocking is executed using the head-related transfer function (e.g., an original head-related transfer function of a user of the HMD 20 or an average head-related transfer function of users having an attribute "adult") determined in advance in the first and second embodiments, whereas in the present embodiment, an attribute used for unlocking is selected from among a plurality of attributes. In other words, in the present embodiment, the user attribute setting unit 301 may select, for example, a target attribute from among a plurality of attributes, such as "16 years or older," "18 years or older" or "20 years or older" in response to a manipulation input of the user and a request from an application. A head-related transfer function corresponding to each of selectable attributes is included in the head-related transfer function data 305.

As a specific use example of such a configuration, for example, the user attribute setting unit 301 may set an attribute "16 years or older" (an age in which viewing of content using the HMD is considered not to affect health) at the time of starting up or mounting of the HMD 20. Further, when content whose rating has been set is reproduced in the HMD 20, the user attribute setting unit 301 may set an attribute (e.g., "18 years or older") according to the rating. By doing this, it is possible to limit viewing of content using the HMD 20 to the HMD itself or users more suitable for the content.

Alternatively, the user attribute setting unit 301 may recognize the attribute of the user of the HMD 20 by setting a plurality of attributes at the time of start-up of the HMD 20 and executing reproduction of the virtual sound source corresponding to each attribute. For example, the user attribute setting unit 301 may set attributes of "adult," "child," "male" and "female" at the time of starting up or mounting of the HMD 20. In this case, in the units subsequent to the head-related transfer function acquisition unit 303, the sound data of the virtual sound source generated using the head-related transfer functions for the respective attributes described above are all continuously reproduced or at least some of the sound data is simultaneously reproduced (e.g., sound data for "adult" and "child" is simultaneously reproduced, and sound data "male" and "female" is simultaneously reproduced). In this case, the virtual sound source position setting unit 107 sets a different position (or position pattern or locus) for each attribute as a position of the virtual sound source. The attribute of the user may be identified according to which attribute corresponding to a position with which the user hearing the sound data of the virtual sound source reproduced in this way replies. For example, if sound data corresponding to paired attributes (e.g., "adult" and "child") are simultaneously reproduced, it is possible to easily identify the attribute of the user since the position corresponding to any one attribute is selectively replied.

In the above example, a result of identifying the attribute for age may be used, for example, to determine whether the HMD 20 itself is available or whether viewing of content is allowed. Further, a result of identifying the attribute for sex may be used, for example, for recommendation of content and display of an advertisement.

(Process Flow)

Figure 22:
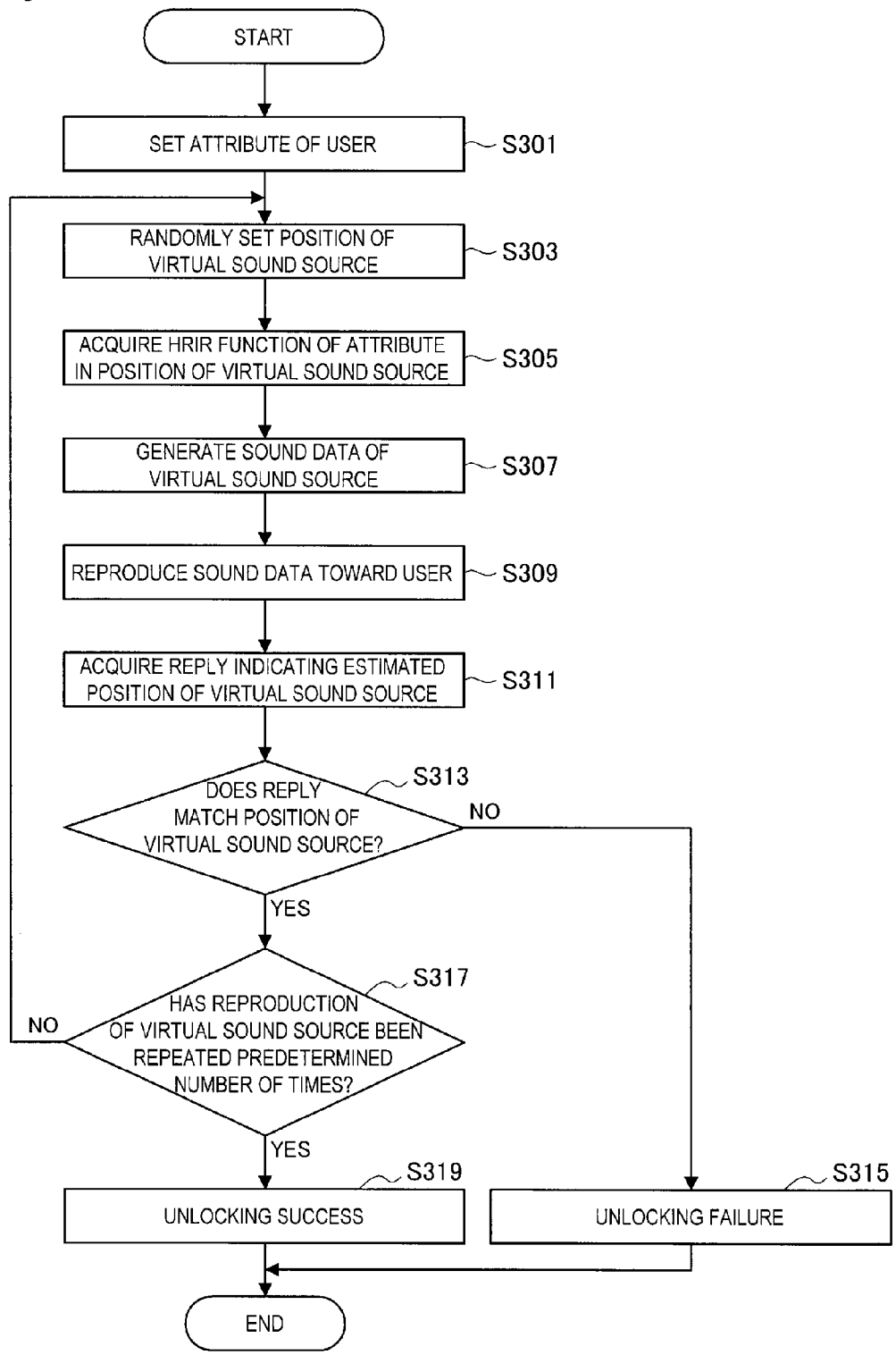
FIG. 22 is a flowchart illustrating an example of an unlocking process in the third embodiment of the present disclosure.

FIG. 22 is a flowchart illustrating an example of an unlocking process in the third embodiment of the present disclosure.

First, the user attribute setting unit 301 sets an attribute of a user used for an unlocking process (step S301). Then, the virtual sound source position setting unit 107 randomly sets the position of the virtual sound source (step S303). Here, the virtual sound source position setting unit 107 randomly selects, for example, the position of the virtual sound source from among the above-described positions $S_1$ to $S_9$. When the user attribute setting unit 301 sets a plurality of attributes, the virtual sound source position setting unit 107 may set a different position for each attribute.

Then, the head-related transfer function acquisition unit 303 acquires an HRIR function corresponding to the attribute set in step S301 in the position of the virtual sound source set in step S303 from among the data stored as the head-related transfer function data 305 in advance (step S305). Here, the acquired HRIR function may be an HRIR function provided as an average head-related transfer function of users having a predetermined attribute in advance.

Then, the generation unit 109 generates the sound data of the virtual sound source by performing convolution of the HRIR function acquired in step S305 with original sound data (step S307). Then, the reproduction unit 115 outputs the sound data to the user through the headphone 21 of the HMD 20 (step S309). Here, when the user attribute setting unit 301 sets a plurality of attributes, the reproduction unit 115 may continuously output the sound data corresponding to each attribute or may simultaneously output the sound data corresponding to at least some of the attributes.

Then, the reply acquisition unit 117 acquires the reply indicating the position of the virtual sound source estimated by the user through the manipulation unit 23 of the HMD 20 (step S311). Here, a predetermined standby time may be set in consideration of a time taken for a thought and a movement of the user between step S309 and step S311. Further, when a plurality of pieces of sound data are continuously output in step S309, a reply for each piece of sound data may be acquired.

For example, when the sound data corresponding to the attributes of "adult" and "child" is simultaneously reproduced and subsequently the sound data corresponding to the attributes of "male" and "female" is simultaneously reproduced in step S309, the reply acquisition unit 117 can acquire a first reply (used to identify whether the user is "adult" or "child") and a second reply (used to identify whether the user is "male" or "female").

Then, the determination unit 119 determines whether the position indicated by the reply acquired in step S311 (the second position) matches the position of the virtual sound source set in step S303 (the first position) (step S313). Further, when a plurality of attributes are set in step S301, the determination herein may be executed for each attribute. In this case, at least one (e.g., "adult" or "child") of the set attributes is used for the determination as to whether or not the function of the HMD 20 is to be unlocked in step S313. Attributes not used for this determination are subjected to an attribute suitability determination for other processes, and provided, for example, as information for recommendation of content, display of an advertisement or the like.

When it is not determined in step S313 described above that the positions match, the determination unit 119 determines "unlocking failure" and the locking unit 121 leaves the function invalid (step S315). The function cited herein may be, for example, all functions of the HMD as in the first embodiment described above or may be a function of viewing some content protected depending on age.

On the other hand, when it is determined in step S313 that the position shown by the replay matches the position of the virtual sound source, the determination unit 119 further determines whether the reproduction of the virtual sound source in steps S303 to S309 is repeated a predetermined number of times (step S317). Here, when sound sources corresponding to a plurality of attributes are reproduced, the number of times to be set may differ for each attribute.

When it is determined in step S317 that the reproduction of the virtual sound source has been repeated a predetermined number of times, the determination unit 119 determines "unlocking success" and the locking unit 121 validates the function (step S319). On the other hand, when it is not determined that the reproduction of the virtual sound source has been repeated a predetermined number of times, the process of reproducing the virtual sound source from step S303 is executed again. In this case, in step S303, the position of the virtual sound source may be randomly set again. Further, the predetermined number of times may be 1 and, in that case, step S317 is not executed.

Further, although not shown, even in the present embodiment, a variant in which the reproduction of the virtual sound source is repeated a predetermined number of times regardless of a correct reply or an incorrect reply, the attribute of the user is determined based on the correct reply rate during the reproduction, and lock is released, as described with reference to FIG. 15 in the first embodiment, is possible. Further, a configuration in which the virtual sound source position setting unit sets the locus of the virtual sound source, the generation unit generates the sound data obtained by virtually reproducing the moving sound source, and the reply acquisition unit acquires the reply of the user based on the line of sight or the gesture of the user, as described with reference to FIGS. 19 and 20 in the second embodiment, is possible.

In the third embodiment of the present disclosure described above, it is possible to control, for example, locking/unlocking corresponding to age limitation of provided content, as well as locking/unlocking at the time of starting-up or mounting of the HMD, by allowing the attribute to be arbitrarily set. Further, information on an attribute for being used for other uses, as well as the attribute used for lock control, can be acquired.

(2-4. Fourth Embodiment)

Next, a fourth embodiment of the present disclosure will be described with reference to FIGS. 23 and 24. This embodiment differs from the first and second embodiments described above in that the virtual sound source is reproduced for any selected user ID. Since the present embodiment is similar to the first embodiment or the second embodiment in other points, a detailed description thereof is omitted. Further, while an example based on the first embodiment will be described in the following description, an example based on the second embodiment is similarly possible.

(Configuration of Function Control Apparatus)

Figure 23:
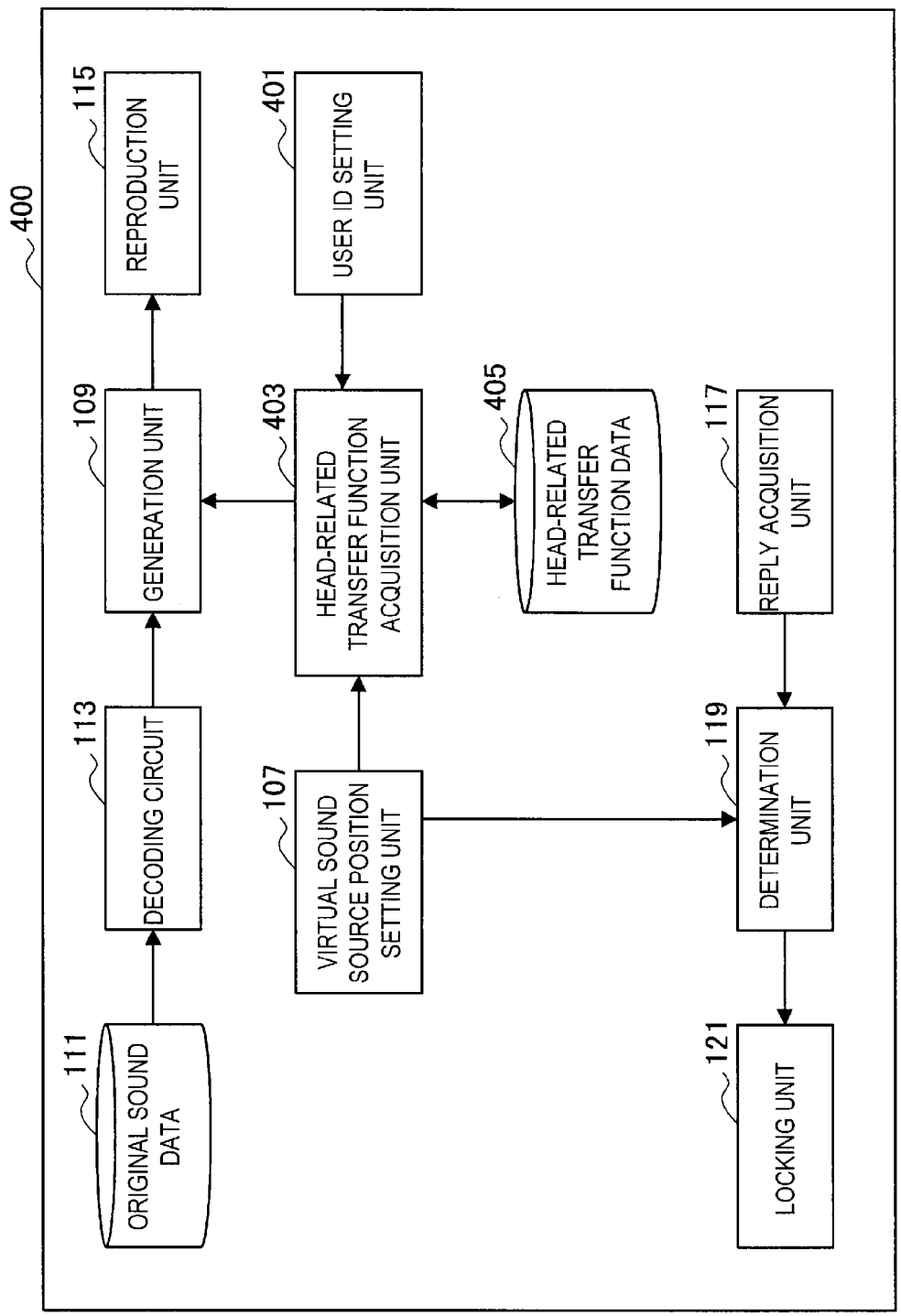
FIG. 23 is a block diagram illustrating a schematic configuration of a function control apparatus according to a fourth embodiment of the present disclosure.

FIG. 23 is a block diagram illustrating a schematic configuration of a function control apparatus according to a fourth embodiment of the present disclosure. Referring to FIG. 23, the function control apparatus 400 includes a user ID setting unit 401, a head-related transfer function acquisition unit 403, a virtual sound source position setting unit 107, a generation unit 109, a decoding circuit 113, a reproduction unit 115, a reply acquisition unit 117, a determination unit 119 and a locking unit 121. Further, the function control apparatus 400 refers to head-related transfer function data 405 and original sound data 111 stored in a storage device or the like. Hereinafter, the function control apparatus 400 will be described in connection with a difference between the function control apparatus 400 and the function control apparatus according to the first embodiment described above.

The user ID setting unit 401 sets an ID of a user used for unlocking and provides information of the set ID to the head-related transfer function acquisition unit 403. The head-related transfer function acquisition unit 403 acquires a head-related transfer function associated with the designated ID with reference to the head-related transfer function data 405. Here, the acquired head-related transfer function may be a head-related transfer function measured for a user corresponding to the ID in advance. In the present embodiment, the data of the head-related transfer function is prepared for a plurality of IDs in advance, and the head-related transfer function acquisition unit 403 selects the head-related transfer function corresponding to the ID set by the user ID setting unit 401 from among the plurality of IDs.

As a difference between the first and second embodiments described above and the present embodiment, unlocking is executed using the head-related transfer function determined in advance in the first and second embodiments, whereas in the present embodiment, an ID used for unlocking is selected from a plurality of user IDs. In other words, in the present embodiment, the user ID setting unit 401 may select a target user ID from the plurality of user IDs, for example, in response to a manipulation input of the user or a request from an application. A head-related transfer function corresponding to each of selectable user IDs may be included in the head-related transfer function data 405.

As a specific use example of such a configuration, for example, the user ID setting unit 401 displays a list of users registered as users at the time of start-up or mounting of the HMD 20 and sets the ID of the user selected from the list by manipulation input as an ID of a user used for unlocking. Accordingly, the function can be unlocked through the unlocking process using a virtual sound source executed later only for a user corresponding to the user ID. Alternatively, when access to a function of reproducing personal content (including a message or the like) or paid content allowed to be accessed by only a specific user is necessary during start-up of the HMD 20, the user ID setting unit 401 may perform the unlocking process using a user ID permitted to access the content.

Such a configuration is effective, for example, when personal content that can be reproduced is limited to personal content of a user that is an unlocking target at the time of start-up or mounting in a case in which the HMD 20 can reproduce personal content of each user. Further, when the user ID and age, sex or the like of the user have been associated, a setting of validity/invalidity of content reproduction according to the age of the user, recommendation of content according to the attribute of the user, display of an advertisement according to the attribute of the user, or the like becomes possible. Further, when the HMD 20 can reproduce paid content, a function of reproducing the content may be validated for only a user purchasing the paid content.

(Process Flow)

Figure 24:
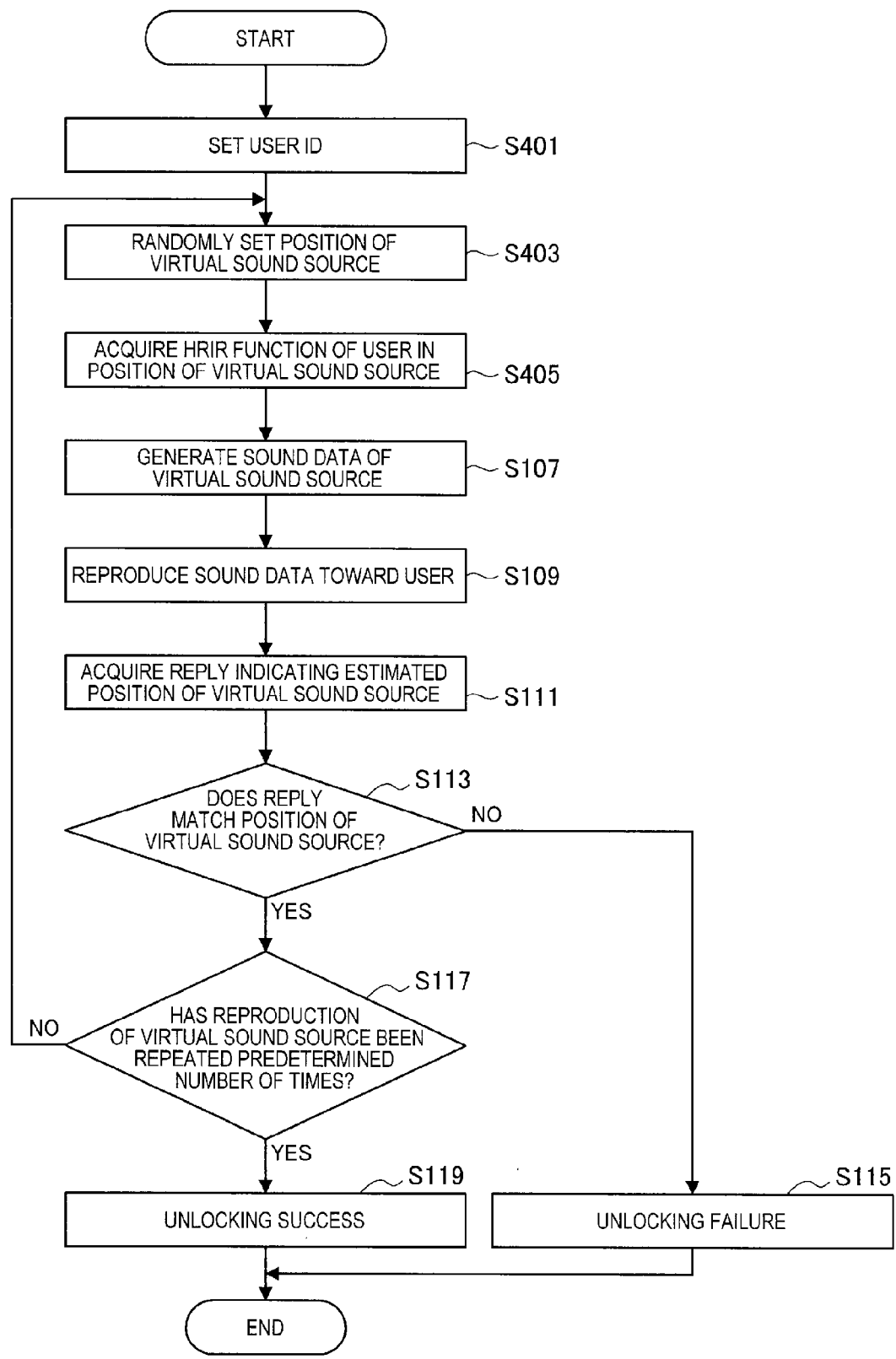
FIG. 24 is a flowchart illustrating an example of an unlocking process in the fourth embodiment of the present disclosure.

FIG. 24 is a flowchart illustrating an example of an unlocking process in the fourth embodiment of the present disclosure.

First, the user ID setting unit 401 sets a user ID used for the unlocking process (step S401). Then, the virtual sound source position setting unit 107 randomly sets the position of the virtual sound source (step S403). Here, the virtual sound source position setting unit 107 randomly selects the position of the virtual sound source from the above-described positions $S_1$ to $S_9$.

Then, the head-related transfer function acquisition unit 403 acquires an HRIR function corresponding to the user ID set in step S401 in the position of the virtual sound source set in step S403 from among the data stored as the head-related transfer function data 405 in advance (step S405). Here, the acquired HRIR function may be an HRIR function measured for a user associated with the ID in advance.

Since a subsequent process (steps S107 to S119) is similar to the process described with reference to FIG. 14 in the first embodiment, a detailed description thereof is omitted. Further, although not shown, even in the present embodiment, a variant in which the reproduction of the virtual sound source is repeated a predetermined number of times regardless of a correct reply or an incorrect reply, the attribute of the user is determined based on the correct reply rate during the reproduction, and lock is released, as described with reference to FIG. 15 in the first embodiment, is possible. Further, a configuration in which the virtual sound source position setting unit sets the locus of the virtual sound source, the generation unit generates the sound data obtained by virtually reproducing the moving sound source, and the reply acquisition unit acquires the reply of the user based on the line of sight or the gesture of the user, as described with reference to FIGS. 19 and 20 in the second embodiment, is possible.

In the fourth embodiment of the present disclosure described above, it is possible to control, for example, locking/unlocking corresponding to a holder, use authority or the like of provided content, as well as locking/unlocking at the time of start-up or mounting of the HMD, by allowing the user ID to be arbitrarily set.

(3. Hardware Configuration)

Figure 25:
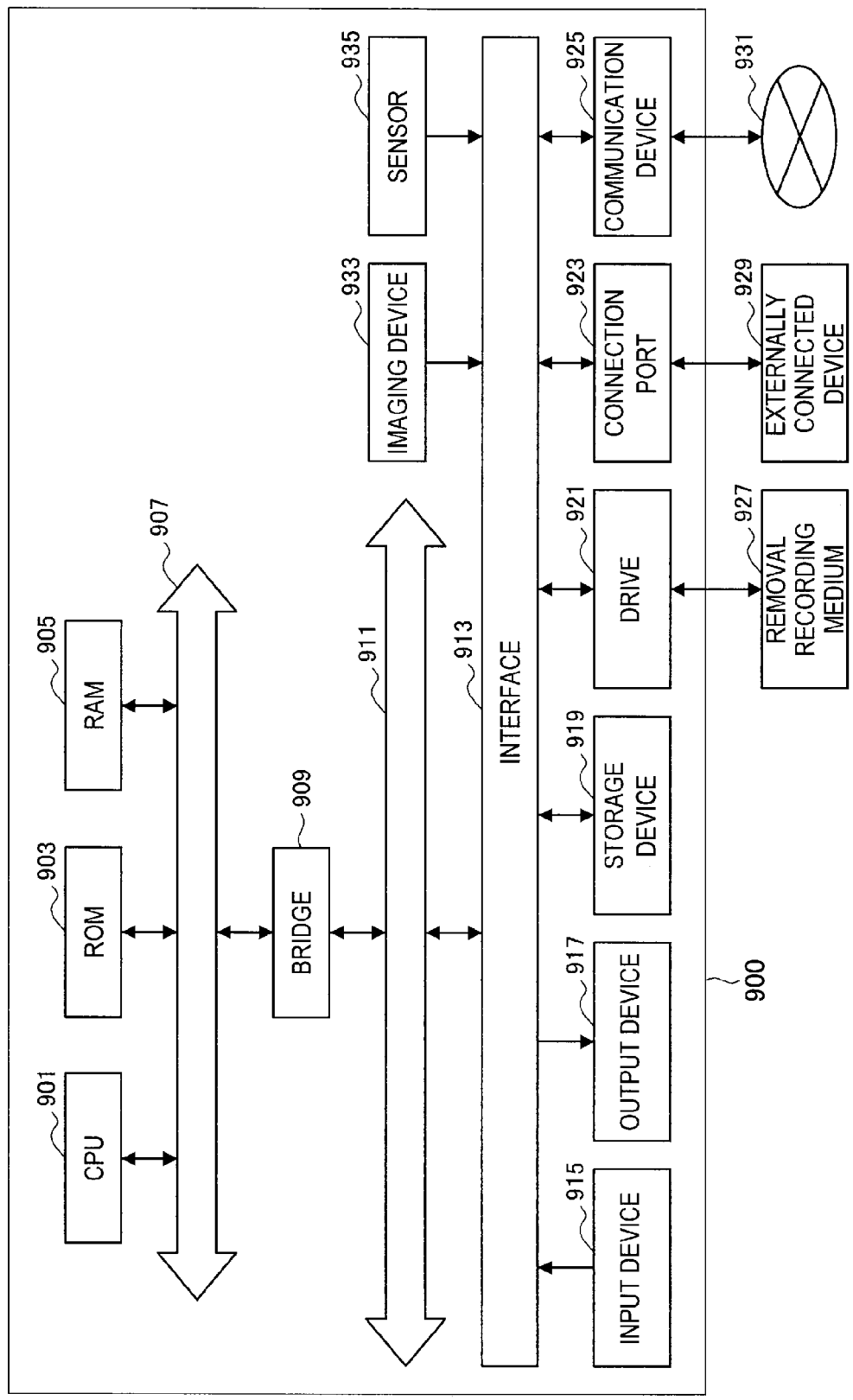
FIG. 25 is a block diagram illustrating a hardware configuration of an information processing apparatus.

Next, a hardware configuration of the information processing apparatus according to an embodiment of the present disclosure will be described with reference to FIG. 25. FIG. 25 is a block diagram illustrating a hardware configuration of the information processing apparatus. The illustrated information processing apparatus 900 may realize, for example, the function control apparatus in the embodiments described above.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

(4. Supplemental Remarks)

Embodiments of the present disclosure encompass a function control apparatus (an information processing apparatus) and system as described in the foregoing, a function control method executed by a function control apparatus or system, a program for causing a function control apparatus to function, and a non-transitory computer readable medium storing such a program, for example.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An electronic device including
processing circuitry configured to
produce an audio sound from a virtual sound source position;
acquire from a user-input a sound position information of a perceived sound source position; and
control an enable or disable of a function of the electronic device based on a relationship between the virtual sound source position and the perceived sound source position.

(2) The electronic device of (1), wherein
the processing circuitry is further configured to determine whether to enable or disable the function.

(3) The electronic device of (1), wherein
the processing circuitry being a single CPU that performs processing to determine whether to enable or disable the function.

(4) The electronic device of (1), wherein
the virtual sound source position is generated based on a head-related transfer function, HRTF.

(5) The electronic device of (4), wherein
the HRTF is user-specific, and includes
a right function HRTF_R that depends on the user U, moving radius r, and deflections angles theta and phi, and expressed as HRTF_R(U, r, theta, phi), and a left function HRTF_L expressed as LRTF_L(U, r, theta, phi).

(6) The electronic device of (5), wherein
the processing circuitry is configured to produce a head-related impulse response, HRIR, by performing an inverse discrete Fourier transform on the HRTF.

(7) The electronic device of (6), wherein
HRIR having a left component expressed as HRIR_L(U, r, theta, phi) and a right components expressed as HRIR_R (U, r, theta, phi).

(8) The electronic device of (7), wherein the processing circuitry is configured to produce the audio sounds as
an output acoustic signal to a left ear of the user, YL, and
an output acoustic signal a right ear of the user YR, wherein YL and YR are generated by a convolution, *, of HRIR_L (U, r, theta, phi), and HRIR_R(U, r, theta, phi) with an original sound X according to $$Y_L = X * \text{HRIR\_L}(U, r, \theta, \phi) \quad \text{(Equation 1)}$$

$$Y_R = X * \text{HRIR\_R}(U, r, \theta, \phi) \quad \text{(Equation 2).}$$

(9) The electronic device of (1), further including
a head mounted display configured to be worn on a head of a user and having left and right speakers configured to produce sound in left and right ears of the user.

(10) The electronic device of (1), wherein
the processing circuitry
selects the virtual sound source position from one of a plurality of different virtual sound source positions, and
compares the virtual sound source position to the perceived sound source position information acquired from the user-input, and
controls the enable of the function of the electronic device when the processing circuitry determines that the perceived sound source position is a closer match to the virtual sound source position than any other of the plurality of different virtual source positions.

(11) The electronic device of (10), wherein
the function is an unlock function that unlocks the electronic device for use.

(12) The electronic device of (4), wherein
the HRTF is an average head-related transfer function of users having a common attribute.

(13) The electronic device of (12),
the function is an unlock function that unlocks the electronic device for use.

(14) The electronic device of (1), further including
a head mounted display configured to be worn on a head of a user and having a display, wherein
the processing circuitry
selects the virtual sound source position from one of a plurality of different virtual sound source positions, and
displays indicia associated with the plurality of different virtual sound source positions.

(15) The electronic device of (1), wherein
the processing circuitry is configured to move the virtual sound source position while the processing circuitry acquires the user-input for the sound position information for a plurality of perceived sound source positions.

(16) The electronic device of (15), further including
a line-of-sight input unit that identifies the user-input for the sound position information by tracking a line-of-sight of a user on a displayed image.

(17) The electronic device of (1), wherein
the processing circuitry is configured to reproduce the audio sound of the virtual source corresponding to a user selectable attribute.

(18) The electronic device of (1), wherein
the processing circuitry associates IDs for a plurality of different users,
the user-input also identifies a particular user from the plurality of different users, and
the function is an unlock function that unlocks the electronic device for use when and ID for the particular user is selected and there is a match between the virtual sound source position and perceived sound source position for that particular user.

(19) An information processing method including
producing with a speaker an audio sound from a virtual sound source position;
acquiring from a user-input interface a sound position information of a perceived sound source position; and
controlling with processing circuitry an enable or disable of a function of the electronic device based on a relationship between the virtual sound source position and the perceived sound source position.

(20) A non-transitory computer readable storage medium having stored therein computer readable instructions that when executed by processing circuitry cause the processing circuitry to execute an information processing method, the method including
producing with a speaker an audio sound from a virtual sound source position;
acquiring from a user-input interface a sound position information of a perceived sound source position; and
controlling with the processing circuitry an enable or disable of a function of the electronic device based on a relationship between the virtual sound source position and the perceived sound source position.

Additionally, the present technology may also be configured as below.

(1)
A function control apparatus including:
a reproduction unit that reproduces, toward a user, sound data obtained by virtually localizing a sound source present in a first position of a space around the user using a head-related transfer function;
an estimated position information acquisition unit that acquires information indicating a second position of the space around the user, the second position being estimated as a position of the sound source by the user hearing the reproduced sound data; and
a determination unit that determines whether at least some functions of an electronic device are to be validated, based on a relationship between the first position and the second position.

(2)
The function control apparatus according to (1), wherein
the head-related transfer function is a head-related transfer function corresponding to the user, and
the determination unit determines that the at least some functions are to be validated, when the first position and the second position match.

(3)
The function control apparatus according to (2), wherein
the determination unit determines that a function of reproducing content permitted to be accessed by the user is to be validated, when the first position and the second position match.

(4)
The function control apparatus according to (1), wherein
the head-related transfer function is a first head-related transfer function corresponding to a user group having a first attribute, and
the determination unit determines that the at least some functions are to be validated, when it is estimated that the user has the first attribute based on a relationship between the first position and the second position.

(5)
The function control apparatus according to (4), wherein
the reproduction unit reproduces, toward the user, first sound data obtained by virtually localizing the sound source using the first head-related transfer function, and second sound data obtained by virtually localizing the sound source using a second head-related transfer function corresponding to a user group having a second attribute different from the first attribute, and
the determination unit determines whether the user has the first attribute or the second attribute, based on whether the second position corresponds to the first position of any one of the first sound data and the second sound data.

(6)
The function control apparatus according to any one of (1) to (5), wherein
the estimated position information acquisition unit acquires a result of detecting a line of sight of the user as the information indicating the second position.

(7)
The function control apparatus according to any one of (1) to (5), wherein
the estimated position information acquisition unit acquires a result of detecting a gesture of the user as the information indicating the second position.

(8)
The function control apparatus according to any one of (1) to (5), wherein
the first position continuously moves during reproduction of the sound data, the estimated position information acquisition unit continuously acquires the information indicating the second position, and
the determination unit determines whether the at least some functions are to be validated, based on a relationship between a locus of the first position and a locus of the second position.

(9)
The function control apparatus according to (8), wherein
the estimated position information acquisition unit continuously acquires a result of detecting a line of sight of the user as the information indicating the second position.

(10)
The function control apparatus according to (8), wherein
the estimated position information acquisition unit continuously acquires a result of detecting a gesture of the user as the information indicating the second position.

(11)
The function control apparatus according to any one of (1) to (7), wherein
the first position is any one position in a position group determined in advance in the space around the user.

(12)
The function control apparatus according to any one of (1) to (11), wherein
the reproduction unit repeats reproduction of the sound data a predetermined number of times,
the estimated position information acquisition unit repeats acquisition of the information indicating the second position the predetermined number of times, and
the determination unit determines that the at least some functions are to be validated, when a number of times the first position and the second position have met a predetermined relationship is equal to or more than a threshold during repetition of the predetermined number of times.

(13) The function control apparatus according to any one of (1) to (12), further including:
a generation unit that generates the sound data.

(14) The function control apparatus according to any one of (1) to (12), further including:
a sound data selection unit that selects the sound data from a sound data group localized in a predetermined position group of the space around the user and provides the sound data to the reproduction unit.

(15) The function control apparatus according to any one of (1) to (14), wherein
the electronic device is a head mount display, and
the determination unit determines that a content reproduction function of the head mount display is to be validated when the user is estimated to be at a predetermined age or older, based on a relationship between the first position and the second position.

(16) The function control apparatus according to (15), wherein the reproduction unit reproduces the sound data through a headphone of the head mount display.

(17) The function control apparatus according to (15) or (16), further including:
a mounting detection unit that detects that the head mount display has been mounted by the user,
wherein the reproduction unit reproduces the sound data when the mounting detection unit detects that the head mount display has been mounted.

(18) A program for causing a computer to realize functions of:
reproducing, toward a user, sound data obtained by virtually localizing a sound source present in a first position of a space around the user using a head-related transfer function;
acquiring information indicating a second position of the space around the user, the second position being estimated as a position of the sound source by the user hearing the reproduced sound data; and
determining whether at least some functions of an electronic device are to be validated, based on a relationship between the first position and the second position.

REFERENCE SIGNS LIST 20 head mount display (HMD)
21 headphone
22 display unit
23 manipulation unit
30 converter
40 system
100, 160, 200, 300, 400 function control apparatus
101 mounting detection unit
103, 303, 403 head-related transfer function acquisition unit
107, 207 virtual sound source position setting unit
109, 209 generation unit
115 reproduction unit
117 reply acquisition unit
119, 219 determination unit
121 locking unit
163 sound data selection unit
217 line-of-sight input unit
301 user attribute setting unit
401 user ID setting unit

The invention claimed is:

1. An electronic device, comprising:
processing circuitry configured to:
acquire an attribute of a first user of the electronic device;
produce an audio sound from a virtual sound source position based on a function that is determined based on the virtual sound source position and the acquired attribute;
acquire from an input by the first user, position information of a perceived sound source position; and
control a functionality of the electronic device based on a relationship between the virtual sound source position and the position information of the perceived sound source position.

2. The electronic device of claim 1, wherein the processing circuitry is further configured to determine whether to enable or disable the functionality.

3. The electronic device of claim 1, wherein the processing circuitry is a central processing unit (CPU) configured to determine whether to enable or disable the functionality.

4. The electronic device of claim 1, wherein the function is a head-related transfer function, HRTF.

5. The electronic device of claim 4, wherein the HRTF includes:
a right function HRTF_R that depends on the first user U, a moving radius r, and deflection angles theta and phi, and is expressed as HRTF_R(U, r, theta, phi); and
a left function HRTF_L expressed as LRTF_L(U, r, theta, phi).

6. The electronic device of claim 5, wherein the processing circuitry is further configured to produce a head-related impulse response, HRIR, based on an inverse discrete Fourier transform of the HRTF.

7. The electronic device of claim 6, wherein the HRIR comprises a left component expressed as HRIR_L(U, r, theta, phi) and a right component expressed as HRIR_R(U, r, theta, phi).

8. The electronic device of claim 7, wherein the produced audio sound comprises:
a first output acoustic signal (YL) for a left ear of the first user; and
a second output acoustic signal (YR) for a right ear of the first user,
wherein YL is generated as:
YL=X * HRIR L(U, r, theta, phi),
wherein YR is generated as:
YR=X * HRIR R(U, r, theta, phi),
wherein * is a convolution operation and X corresponds to a sound signal that is different from the produced audio sound.

9. The electronic device of claim 4, wherein
the acquired attribute is a common attribute of users of the electronic device other than the first user, and
the HRTF is an average head-related transfer function of the users of the electronic device other than the first user having the common attribute.

10. The electronic device of claim 9, wherein
the functionality is an unlock function, and
the processing circuitry is further configured to unlock the electronic device for use based on the relationship between the virtual sound source position and the position information of the perceived sound source position.

11. The electronic device of claim 1, further comprising:
a head mounted display configured to be worn on a head of the first user; and
a left speaker and a right speaker, configured to produce the audio sound in left and right ears of the first user respectively.

12. The electronic device of claim 1, wherein the processing circuitry is further configured to:
select the virtual sound source position as one of a plurality of spatial positions;
compare the virtual sound source position with the position information of the perceived sound source position; and
enable the functionality of the electronic device based on a determination that the perceived sound source position is a closer match to the virtual sound source position than to a spatial position other than the virtual sound source position of the plurality of spatial positions.

13. The electronic device of claim 12, wherein
the functionality is an unlock function, and
the processing circuitry is further configured to unlock the electronic device for use based on the determination that the perceived sound source position is a closer match to the virtual sound source position than to the spatial position other than the virtual sound source position of the plurality of spatial positions.

14. The electronic device of claim 1, further comprising
a head mounted display configured to be worn on a head of the first user, and
wherein the processing circuitry is further configured to:
select the virtual sound source position as one of a plurality of different virtual sound source positions; and
display indicia associated with the plurality of different virtual sound source positions.

15. The electronic device of claim 1, wherein the processing circuitry is further configured to move the virtual sound source position based on acquisition of a plurality of user-inputs for the position information for a plurality of perceived sound source positions.

16. The electronic device of claim 15, further comprising a line-of-sight input unit configured to track a line-of-sight of the first user on a displayed image to identify each of the plurality of the user-inputs for the position information for the plurality of perceived sound source positions.

17. The electronic device of claim 1, wherein the processing circuitry is further configured to reproduce the audio sound of the virtual source corresponding to a user selectable attribute.

18. The electronic device of claim 1, wherein the processing circuitry is further configured to:
associate IDs for a plurality of different users; and
identify the first user from the plurality of different users,
wherein the functionality is an unlock function, and
wherein the processing circuitry is further configured to unlock the electronic device for use based on:
a selection of an ID for the first user; and
determination of a match between the virtual sound source position and perceived sound source position for the first user.

19. The electronic device of claim 1, wherein the acquired attribute is one of an age of the first user, an age group of the first user or a gender of the first user.

20. An information processing method, comprising:
in an electronic device:
acquiring an attribute of a user of the electronic device;
producing with a speaker an audio sound from a virtual sound source position based on a function that is determined based on the virtual sound source position and the acquired attribute;
acquiring from an input by the user on an interface, a position information of a perceived sound source position; and
controlling a functionality of the electronic device based on a relationship between the virtual sound source position and the position information of the perceived sound source position.

21. A non-transitory computer-readable medium having stored thereon computer-executable instructions for causing a processing circuitry of an electronic device to execute operations, the operations comprising:
acquiring an attribute of a user of the electronic device;
producing with a speaker an audio sound from a virtual sound source position based on a function that is determined based on the virtual sound source position and the acquired attribute;
acquiring from an input by the user on an interface, a position information of a perceived sound source position; and
controlling a functionality of the electronic device based on a relationship between the virtual sound source position and the position information of the perceived sound source position.

* * * * *